United States Patent
Driscoll et al.

(10) Patent No.: US 10,833,380 B2
(45) Date of Patent: *Nov. 10, 2020

(54) HOLOGRAPHIC MODE CONVERSION FOR TRANSMISSION LINES

(71) Applicant: Elwha LLC, Bellevue, WA (US)

(72) Inventors: Tom Driscoll, San Diego, CA (US); John Desmond Hunt, Knoxville, TN (US); Nathan Ingle Landy, Mercer Island, WA (US); David R. Smith, Durham, NC (US); Yaroslav A. Urzhumov, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,444

(22) Filed: Mar. 5, 2019

(65) Prior Publication Data

US 2019/0273298 A1    Sep. 5, 2019

Related U.S. Application Data

(63) Continuation of application No. 15/651,947, filed on Jul. 17, 2017, now Pat. No. 10,224,587, which is a (Continued)

(51) Int. Cl.
*H01P 1/16* (2006.01)
*G02B 6/28* (2006.01)
(Continued)

(52) U.S. Cl.
CPC ............ *H01P 1/16* (2013.01); *G02B 1/002* (2013.01); *G02B 5/32* (2013.01); *G02B 6/00* (2013.01);
(Continued)

(58) Field of Classification Search
CPC . H01P 1/172; H01P 1/16; H01P 5/082; G02B 6/14
See application file for complete search history.

(56) References Cited

U.S. PATENT DOCUMENTS

| | | | |
|---|---|---|---|
| 4,510,469 A * | 4/1985 | Bowman | ............... H01P 1/16 333/137 |
| 5,148,134 A | 9/1992 | Krill | |

(Continued)

OTHER PUBLICATIONS

Driscoll et al., Performance of a three dimensional transformation-optical-flattened Luneburg lens, Optics Express, Jun. 4, 2012, vol. 20 No. 12, Optical Society of America.
(Continued)

*Primary Examiner* — Dean O Takaoka
*Assistant Examiner* — Alan Wong

(57) ABSTRACT

The present disclosure provides systems and methods associated with mode conversion for electromagnetic field modification. A mode converting structure (holographic metamaterial) is formed with a distribution of dielectric constants chosen to convert an electromagnetic radiation pattern from a first mode to a second mode to attain a target electromagnetic radiation pattern that is different from the input electromagnetic radiation pattern. A solution to a holographic equation provides a sufficiently accurate approximation of a distribution of dielectric constants that can be used to form a mode converting device for use with one or more transmission lines, such as waveguides. One or more optimization algorithms can be used to improve the efficiency of the mode conversion.

40 Claims, 31 Drawing Sheets
(10 of 31 Drawing Sheet(s) Filed in Color)

Related U.S. Application Data continuation of application No. 14/708,043, filed on May 8, 2015, now Pat. No. 9,711,831.

(51) Int. Cl.

| | | |
|---|---|---|
| *G02B 5/32* | (2006.01) | |
| *G02B 27/28* | (2006.01) | |
| *G02B 1/00* | (2006.01) | |
| *H01Q 15/02* | (2006.01) | |
| *H01Q 19/06* | (2006.01) | |
| *G03H 1/00* | (2006.01) | |
| *G03H 1/08* | (2006.01) | |
| *G02B 6/00* | (2006.01) | |
| *H01P 5/02* | (2006.01) | |
| *H01P 5/19* | (2006.01) | |
| *H01P 5/20* | (2006.01) | |
| *H01P 5/22* | (2006.01) | |
| *H01Q 1/42* | (2006.01) | |
| *H01Q 13/02* | (2006.01) | |
| *H01Q 13/06* | (2006.01) | |

(52) U.S. Cl.
CPC .......... *G02B 6/2848* (2013.01); *G02B 27/286* (2013.01); *G03H 1/0005* (2013.01); *G03H 1/0808* (2013.01); *H01Q 15/02* (2013.01); *H01Q 19/062* (2013.01); *H01Q 19/067* (2013.01); *H01P 5/022* (2013.01); *H01P 5/19* (2013.01); *H01P 5/20* (2013.01); *H01P 5/222* (2013.01); *H01Q 1/42* (2013.01); *H01Q 13/02* (2013.01); *H01Q 13/06* (2013.01)

(56) References Cited

U.S. PATENT DOCUMENTS

| | | | | |
|---|---|---|---|---|
| 5,942,956 | A * | 8/1999 | Haq | H01P 1/16 333/21 R |
| 6,147,569 | A | 11/2000 | Kishino | |
| 6,624,077 | B2 | 9/2003 | White | |
| 6,624,715 | B2 * | 9/2003 | Yuanzhu | H01P 1/172 333/21 A |
| 8,248,178 | B2 * | 8/2012 | Lange | H01P 1/171 333/21 A |
| 8,466,370 | B2 * | 6/2013 | Lier | H01Q 13/02 174/258 |
| 8,598,960 | B2 * | 12/2013 | Blaser | H01Q 13/20 333/21 A |
| 9,515,363 | B2 * | 12/2016 | Herbsommer | H01P 3/16 |
| 9,570,812 | B2 | 2/2017 | Driscoll | |
| 9,711,831 | B2 * | 7/2017 | Driscoll | G02B 6/2848 |
| 10,224,587 | B2 * | 3/2019 | Driscoll | G02B 6/2848 |
| 2015/0222021 | A1 | 8/2015 | Stevenson et al. | |

OTHER PUBLICATIONS

Larouche et al., Nanotube holograms, Nature, Nov. 1, 2012, pp. 47-48, vol. 491, Macmillan Publishers Limited.
Landy et al., A full-parameter unidirectional metamaterial cloak for microwaves, Nature Materials, Nov. 11, 2012, pp. 1-4, Macmillan Publishers Limited.
Hunt et al., Broadband Wide Angle Lens Implemented with Dielectric Metamaterials, www.mdpi.com/journal/sensors, Aug. 12, 2011, pp. 7982-7991.
Larouche et al., Infrared metamaterial phase holograms, Nature Materials, Mar. 18, 2012, pp. 450-454, vol. 11.
Hunt et al., Planar, flattened Luneburg lens at infrared wavelengths, Optics Express, Jan. 16, 2012, pp. 1706-1713, vol. 20 No. 2, Optical Society of America.
Urzhumov et al., Thin low-loss dielectric coatings for free-space cloaking, Optics Letters, May 15, 2013, pp. 1606-1608, vol. 38 No. 10, Optical Society of America.
Urzhumov et al., Low-loss directional cloaks without superluminal velocity or magnetic response, Optics Letters, Nov. 1, 2012, pp. 4471-4473, vol. 37 No. 21, Optical Society of America.
Ni et al., Metasurface holograms for visible light, Nature Communications, Nov. 15, 2013, pp. 1-6, Macmillan Publishers Limited.
Leon-Saval et al., Mode-selective photonic lanterns for space-division multiplexing, Optics Express, Jan. 13, 2014, pp. 1-9, vol. 22 No. 1, Optical Society of America.
Lalau-Keraly et al., Adjoint shape optimization applied to electromagnetic design, Optics Express, Sep. 9, 2013, pp. 21693-21701, vol. 21 No. 18, Optical Society of America.
Lin et al., Nanostructured Holograms for Broadband Manipulation of Vector Beams, Nano Letters, Aug. 5, 2013, pp. 4269-4274, American Chemical Society.
Jin et al., Advances in Particle Swarm Optimization for Antenna Designs: Real-Number, Binary, Single-Objective and Multiobjective Implementations, IEEE Transactions on Antennas and Propagation, Mar. 2007, pp. 556-567, vol. 55 No. 3, IEEE.
Zhu et al., Design and Optimization of Low Rcs Patch Antennas Based on a Genetic Algorithm, Progress in Electromagnetics Research, 2012, pp. 327-339, vol. 122.
Wu et al., Design Synthesis of Metasurfaces for Broadband Hybrid-Mode Horn Antennas With Enhanced Radiation Pattern and Polarization Characteristics, IEEE Transactions on Antennas and Propagation, Aug. 2012, pp. 3594-3604, vol. 60 No. 8, IEEE.
Boeringer et al., Efficiency-Constrained Particle Swarm Optimization of a Modified Bernstein Polynomial for Conformal Array Excitation Amplitude Synthesis, IEEE Transactions on Antennas and Propagation, Aug. 2005, pp. 2662-2673, vol. 53 No. 8, IEEE.
Yu et al., Flat optics with designer metasurfaces, Nature Materials, Jan. 23, 2014, pp. 139-150, vol. 13, Macmillan Publishers Limited.
Jensen et al., Topology optimization for nano-photonics, Laser Photonics, 2011, pp. 308-321, Rev 5 No. 2, Wiley-Vhe Verleg GmbH & Co.
Orihara et al., Optimization and application of hybrid-level binary zone plates, Applied Optics, Nov. 10, 2001, pp. 5877-5885, vol. 40 No. 32, Optical Society of America.
Seliger et al., Optimization of aperiodic dielectric structures, http://dx.doi.org/10.1063/1.2221497, Aug. 8, 2006, visited Aug. 11, 2014.
Toader et al., Photonic Band Gap Architectures for Holographic Lithography, Physical Review Letters, Jan. 30, 2004, pp. 1-4, vol. 92 No. 4, The American Physical Society.
Sharp et al., Photonic crystals for the visible spectrum by holographic lithography, Optical and Quantum Electronics 34, 2002, pp. 3-12, Kluwer Academic Publishers.
Fong et al., Scalar and Tensor Holographic Artificial Impedance Surfaces, IEEE Transactions on Antennas and Propagation, Oct. 2010, pp. 3212-3221, vol. 58 No. 10, IEEE.
Kildishev et al., Planar Photonics with Metasurfaces, Science 339, http://www.sciencemag.org/content/339/6125/1232009.full.html, Mar. 15, 2013, visited Oct. 8, 2014.
Sravanamuttu et al., Sol-Gel Organic-Inorganic Composites for 3-D Holographic Lithography of Photonic Crystals with Submicron Periodicity, American Chemical Society, Apr. 29, 2003, 4 pgs.
Bayraktar et al., The Design of Miniature Three-Element Stochastic Yagi-Uda Arrays Using Particle Swarm Optimization, IEEE Antennas and Wireless Propagation Letters, Nov. 22, 2005, pp. 22-26, IEEE.
Miller, Photonic Design: From Fundamental Solar Cell Physics to Computational Inverse Design, Thesis, Spring 2012, pp. 137.
Huang et al., Three-dimensional optical holography using a plasmonic metasurface, Nature Communications, Nov. 15, 2013, pp. 1-8, Macmillan Publishers Limited.
Yu et al., Topology optimization for highly-efficient light-trapping structure in solar cells, Research paper, May 10, 2014, pp. 367-382, Springer-Verlag Berlin Heidelberg 2014.
PCT International Search Report, International App. No. PCT/US2018/033450; dated Sep. 14, 2018; pp. 1-3
PCT ISR, International App No. PCT/US2016/020915; dated Jul. 11, 2016; pp. 1-2.

* cited by examiner

HOLOGRAPHIC MODE CONVERSION FOR TRANSMISSION LINES

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. § 119(e) for provisional patent applications, for any and all parent, grandparent, great-grandparent, etc., applications of the Priority Application(s)). In addition, the present application is related to the "Related Applications," if any, listed below.

PRIORITY APPLICATIONS

This application is a continuation of U.S. patent application Ser. No. 15/651,947, filed Jul. 17, 2017, which is a continuation of U.S. patent application Ser. No. 14/708,043, filed May 8, 2015, for "Holographic Mode Conversion for Transmission Lines," with inventors Tom Driscoll, John Desmond Hunt, Nathan Ingle Landy, David R. Smith, Yaroslav A. Urzhumov, which applications are incorporated herein by reference in their entirety.

RELATED APPLICATIONS

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc., applications of the Priority Applications and the Related Applications, including any priority claims, is incorporated herein by reference to the extent such subject matter is not inconsistent herewith.

TECHNICAL FIELD

This disclosure relates to dielectric mode converting structures for transmission lines and waveguides. The dielectric mode converting structures are configured to convert electromagnetic energy from a first mode to a second mode to modify one or more characteristics of the electromagnetic energy.

SUMMARY

The present disclosure includes various systems, apparata, and methods for relating to mode converting structures configured to modify transmitted electromagnetic energy. For example, a mode converting structure may have a volumetric distribution of dielectric constants to modify a transmission in (or from) a waveguide or other transmission line for a finite frequency range from a first mode to a second mode. The mode converting structure may be divided (actually and/or conceptually) into a plurality of sub-wavelength voxels. Each voxel may have a maximum dimension that is less than a wavelength within the finite frequency range. Each voxel may be assigned one of a plurality of dielectric constants to approximate a specific distribution of dielectric constants of the mode converting structure.

As described in detail herein, any of a wide variety of methods and equations can be used to find a volumetric distribution of dielectric constants, $\varepsilon(x,y,z)$, given a desired or goal field distribution, $E_{goal}$, and a measured, estimated, or otherwise known distribution of electromagnetic radiation (EMR) sources, $Q(x,y,z)$.

Various methods of manufacturing are described herein, including rotational molding, rotocasting, extrusion, and three-dimensional printing. Given a target transmission pattern for an EMR device and domain boundaries for a mode converting structure, a mode converting structure can be generated that will convert the electromagnetic field generated by the EMR device from a first mode and field pattern to a second mode and field pattern. The mode converting structure may be specified as a volumetric distribution of dielectric constants that can be approximated using a continuous manufacturing technique that involves spatially inhomogeneous deposition of a homogeneous mixture of materials having various dielectric constants.

Relatedly, a dielectric structure may be divided into a plurality of sub-wavelength voxels that each have a maximum dimension that is less than a wavelength (e.g., three-quarters, half, one-third, one-quarter, one-tenth of a wavelength) for a specific frequency range. Each voxel may then be assigned one of a plurality of dielectric constants to approximate an identified distribution of dielectric constants that will convert electromagnetic energy from a first mode to a second mode for a first waveguide. For example, the distribution of dielectric constants may convert electromagnetic energy within the waveguide at a first mode to a second mode.

As another example, the dielectric structure may be configured to convert electromagnetic energy within a first waveguide from a first mode to a second mode for transmission through a second (and optionally a third, fourth, fifth, etc.) waveguide. In some embodiments, the dielectric structure with a specific distribution of dielectric constants may be configured to convert electromagnetic energy within a first waveguide from a first mode to a second mode for transmission out of the waveguide into free space.

In each of the embodiments described herein, the various embodiments, modifications, adaptations, equations, algorithms, and/or other variations may be adapted for use in free-space applications, in transmitting antennas, in receiving antennas, within a waveguide, between two different waveguides, from a transmission line to free space, from a first transmission line to a second transmission line, between a waveguide transmission line to a non-waveguide transmission line, from a non-waveguide transmission line to a waveguide transmission line, for any of a wide variety of frequencies and bandwidths, and/or in combinations of any of the above.

Thus, embodiments in which EMR devices are described are equally applicable to embodiments relating to waveguides and other transmission lines, even if not explicitly stated. Conversely, embodiments and variations described in the context of waveguides and other transmission lines are equally applicable to EMR devices for free-space electromagnetic radiation transmission and reception. Additionally, embodiments described in the context of waveguides are equally applicable to various other transmission lines, and vice versa.

In at least some embodiments, the mode converting structure may be specified as a volumetric distribution of dielectric constants to be approximated using one or more discrete materials having specific dielectric constants. For example, a binary (two-level piecewise-constant) dielectric implementation can be used that is based on the binary discretization of a calculated graded-index or continuous distribution of dielectric constants. The dielectric constant distribution may function as a holographic metamaterial for relevant frequency range of an associated EMR device. The holographic metamaterial concepts discussed herein should not be confused with "metamaterial holograms," which relate to producing hologram images and are not capable of, or used for, converting the majority of the input radiation into a mode with prescribed properties, as a means of creating custom electromagnetic field distributions in the near and/or far field zones.

The methods described herein provide a way to calculate a sufficiently accurate approximation of a volumetric distribution of dielectric constants that will modify an input field from a first mode to a desired output field in a second mode. Additionally, various manufacturing techniques described herein, including a binary (or ternary, quaternary, etc.) three-dimensional printing approach, allow for a mode converting structure to be generated that sufficiently approximates the calculated volumetric distribution of dielectric constants.

Additional embodiments, variations, alternatives, and combinations thereof are provided below. It is appreciated that any of the various embodiments, alternatives, variations, features, and the like may be combined in any feasible and suitable way for a particular application and/or adaptation.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
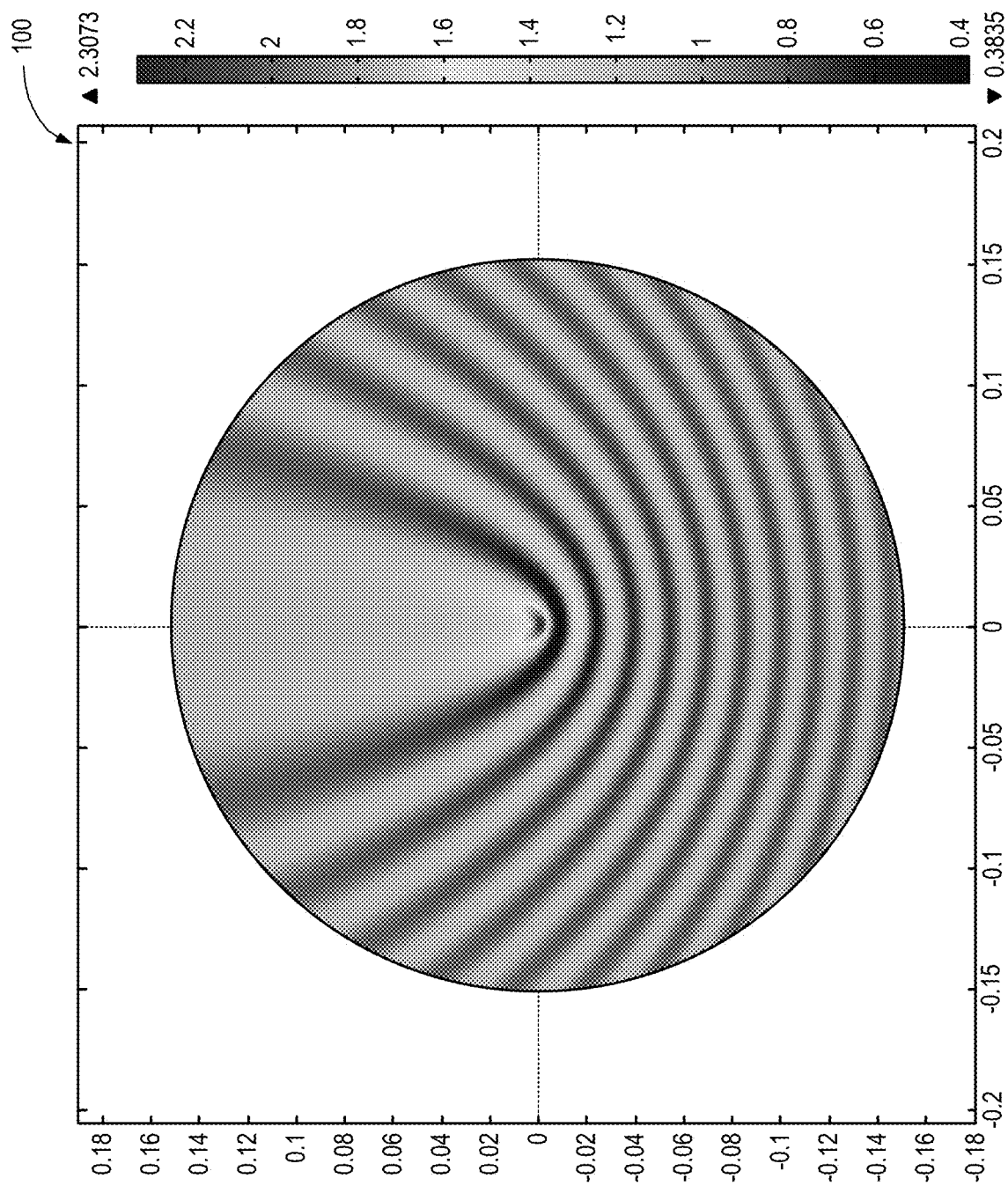
FIG. 1A illustrates an example of a volumetric holographic medium showing real values of a volumetric distribution of dielectric constants for increasing the directionality of a two-dimensionally isotropic line source EMR device.

According to various embodiments, systems, apparata, and methods are described herein that relate to mode converting structures configured to modify field patterns of electromagnetic radiation (EMR) devices. A mode converting structure generated with a volumetric distribution of dielectric constants can be used to convert an electromagnetic field from a first mode as generated by an original EMR device to a second mode with more desirable properties. For example, the second mode may have a narrower beamwidth, a higher directional gain, lower far-field sidelobes, and/or a more uniform radiation profile in the radiative near-field. In some embodiments, the mode converting structure may modify the field pattern to compensate or negate the effects of a re-radiating object in the near- or far-field of the EMR device.

The distribution of dielectric constants of the mode converting structure may be selected to modify a field pattern of the EMR device for a finite frequency range and convert EMR from a first mode to a second mode. In various embodiments, the mode converting structure may be idealized as a graded-permittivity structure having a continuous distribution of dielectric constants, such that there are no abrupt changes in permittivity across the structure. Given a finite range of wavelengths, a discretized piecewise-continuous approximation of the graded-permittivity structure may be electromagnetically equivalent for a given bandwidth.

Thus, in various embodiments, the mode converting structure may be divided into a plurality of sub-wavelength voxels. That is, the mode converting structure may be conceptually thought of as comprising a plurality of voxels (three-dimensional pixels) whose largest dimension is smaller than a wavelength within the relevant bandwidth. For example, each voxel may have a maximum dimension that is less than half of a wavelength (e.g., the smallest wavelength) within a predetermined frequency range. The mode converting structure may be referred to as a holographic metamaterial device useful to modify the near-field and/or far-field of an EMR device for a particular frequency range.

In some embodiments, the voxels may be cubes, parallelepipeds, tetrahedrons, prisms, various regular polyhedrons, or other polyhedrons. In some embodiments, a voxel may have one or two dimensions that are sub-wavelength while the other dimension(s) are larger than a wavelength.

In various embodiments, a combination of voxel shapes and/or sizes may be used. Moreover, voxels may be shaped and/or sized such that little or no space, gaps, or voids exist between voxels. Alternatively, voxels may be arranged such that gaps or voids of various sizes and/or shapes exist. In some embodiments, the gaps or voids may be ignored and/or negligible in calculating the volumetric dielectric constants. Alternatively, the gaps or voids may be assigned one or more dielectric constants corresponding to a vacuum or to air or another fluid that fills the gaps or voids.

Throughout this disclosure, discussions of discretizing the mode converting structure may mean different things in various embodiments. For example, in some embodiments, the conceptual discretization of the mode converting structure may be used for optimization algorithms, while the mode converting structure may not be physically discretized. In some embodiments, the discretization of the mode converting structure may be a physical discretization of the mode converting structure. Physical discretization may be useful for manufacturing simplification (e.g., for three-dimensional printing of a mode converting structure). Thus, allusions to discretizing, dividing into voxels, and the like should be understood in the context of either manufacturing or optimization, and sometimes both. In the absence of explicit context, discussions should be construed as implying manufacturing and optimization individually, and as implying the possibility of a discretization for both manufacturing and optimization.

A manufactured mode converting structure may be positioned relative to an EMR device, may be removable, and/or may be configured as a retrofit solution for an existing antenna system. The shape and dimensions of the mode converting structure may be adapted based on the EMR device used. In various embodiments, an EMR device may include, by way of example but not limitation, a radio frequency antenna, an optical radiation transmitter, and an optical radiation receiver, and/or an electro-optical EMR device configured to convert between electric current and optical radiation or vice versa.

The mode converting structure may be used to modify field distributions of the EMR device. For instance, a mode converting structure may be used to modify the field distribution of a low-directivity antenna to correspond to that of a higher-directivity, narrow-beamwidth antenna. The mode converting structure allows for the beam pattern of the antenna to be modified without any or at least any significant modification to metallic portions of the antenna, the antenna feed, and/or the environment of the antenna. Thus, the mode converting structures disclosed herein allow for a retrofit modification of existing antennas and/or other EMR devices.

The following specific examples use radio frequency (RF) antennas as an example of EMR devices generally. However, it is appreciated that many of the same concepts, embodiments, and general functionality of the systems and methods described herein are equally applicable to other frequency ranges of EMR, including those utilizing low-frequency RF, microwave, millimeter-wave, Terahertz, far and mid-infrared, near infrared, visible light, ultraviolet, x-rays, gamma rays, and so forth. It is appreciated that the sizes, dielectric values, materials, and other variables may be adjusted based on the particular spectrum in use.

Many antennas, such as electrically small dipoles, monopoles, and loop antennas are fundamentally limited in their directionality. Horn-shaped antennas can have better directionality, so long as their dimensions are not significantly sub-wavelength. At any rate, once fabricated and installed, fixed-shape, single-feed antennas generally have a fixed radiation pattern and a certain beamwidth, although it may vary based on frequency.

Additionally, as described above, a dielectric structure may be divided into a plurality of sub-wavelength voxels that each have a maximum dimension that is less than a wavelength (e.g., three-quarters, half, one-third, one-quarter, one-tenth of a wavelength) for a specific frequency range. As above, each voxel may then be assigned one of a plurality of dielectric constants to approximate an identified distribution of dielectric constants. Instead of being used for free-space antennas for receiving and/or transmitting electromagnetic radiation, the mode converting structure may be utilized to convert electromagnetic energy from a first mode to a second mode within a first waveguide, between two waveguides, between a waveguide and free space, and/or between free space and a waveguide.

For example, the distribution of dielectric constants may convert electromagnetic energy within the waveguide at a first mode to a second mode. As another example, the dielectric structure may be configured to convert electromagnetic energy within a first waveguide from a first mode to a second mode for transmission through one or more additional waveguides.

Again, in each of the embodiments described herein, the embodiments, modifications, adaptations, equations, algorithms, and/or other variations may be adapted for use in free-space applications, in transmitting antennas, in receiving antennas, within a waveguide, between two different waveguides, from a transmission line to free space, from a first transmission line to a second transmission line, between a waveguide transmission line to a non-waveguide transmission line, from a non-waveguide transmission line to a waveguide transmission line, for any of a wide variety of frequencies and bandwidths, and/or in combinations and permutations of any of the above.

Thus, embodiments in which EMR devices, antennas, and free-space applications are used as the example application for a mode converting device are equally applicable to embodiments relating to waveguides and other transmission lines, even if not explicitly stated herein.

As described above, mode converting structures may be used to transform the near-field and/or far-field of a fixed antenna without necessarily modifying the antenna, installation, and/or surrounding environment. According to various embodiments, a holographic solution may be used to determine a volumetric distribution of dielectric constants that can provide a desired field transformation and mode conversion for free-space applications and waveguide/transmission line applications alike.

For example, a volumetric distribution of dielectric constants can be determined using Equation 1 below, or a variation thereof:

$$\varepsilon_{hol}(x,y,z) - 1 = \beta E_{goal} \cdot E_{in}^* / |E_{in}|^2 \quad \text{Equation 1}$$

In Equation 1, $\varepsilon_{hol}(x,y,z)$ represents a volumetric distribution of dielectric constants in an x,y,z coordinate system. In many embodiments described herein, a Cartesian coordinate system is used as a default example; however, any of a wide variety of coordinate systems are suitable, including cylindrical, polar, barycentric, trilinear, and other coordinate systems. In fact, in some embodiments, alternative coordinate systems may be preferable to simplify calculations and/or facilitate manufacturing. For instance, a cylindrical coordinate system may be useful for a manufacturing technique in which the volumetric distribution of dielectric constants corresponds to a uniform rotation of a two-dimensional planar cross section around an axis of revolution.

In Equation 1, represents a normalization constant and $E_{in}$ represents an input field distribution of EMR from (1) an EMR device on the surface of the mode converting structure relative to the x,y,z coordinate system, (2) the input field distribution of EMR within a first waveguide or first waveguide portion relative to the x, y, z coordinate system, or (3) the input field distribution of the EMR from free space into a waveguide relative to the x,y,z coordinate system. Subsequent descriptions of Equation 1 with application to EMR devices, such as antennas, are equally applicable to waveguide and free-space applications. $E_{goal}$ represents the "goal" or selected/desired output field distribution of EMR from the mode converting structure relative to the x,y,z coordinate system.

The calculated distribution of dielectric constants may be approximated by conceptually dividing the mode converting structure into a plurality of voxels. Each voxel can then be assigned a permittivity value. In some embodiments, each voxel may be assigned a spatial average value corresponding to the average calculated permittivity value for the volume of the voxel.

In embodiments in which the discretization is binary, ternary, or N-ary, each voxel may be assigned a dielectric constant from a selection of N discrete dielectric constants, where N is an integer greater than 1 (2 for binary, 3 for ternary, and so forth).

As a specific example, a region having a size that is distinguishable at the frequency used by an EMR may contain multiple voxels. If the region should have, on average, a dielectric constant of 5.0, this may be satisfied by conceptually dividing the region into 100 voxels and using graphite, with a dielectric constant of 11, to fill 23 of those voxels and polystyrene, with a dielectric constant of 3.2, to fill the other 77 voxels. Thus, the average dielectric constant of the region will approximate 5.0. Similar approximations can be made using any number of materials having any number of dielectric constants. In some embodiments, frequency-dependent metamaterials having effective dielectric constants less than 1.0 and exhibiting an active-gain can be used as well.

In various embodiments, the volumetric distribution of dielectric constants may be substantially homogenous in one spatial dimension of the coordinate system, such that the volumetric distribution of the mode converting structure is effectively two-dimensional even though it is physically a three-dimensional object. For instance, the volumetric distribution may correspond to a uniform extrusion of a planar two-dimensional distribution perpendicular to the plane.

FIG. 1A illustrates an example of a holographic solution showing real values of a volumetric distribution of dielectric constants 100 using Equation 1 above. The illustrated volumetric distribution of dielectric constants is calculated for an idealized two-dimensionally isotropic line source EMR device. A mode converting structure (i.e., a holographic metamaterial) with a corresponding distribution of dielectric constants could be used as a cover for the line source EMR device to increase the directionality of the line source EMR device.

Figure 1B:
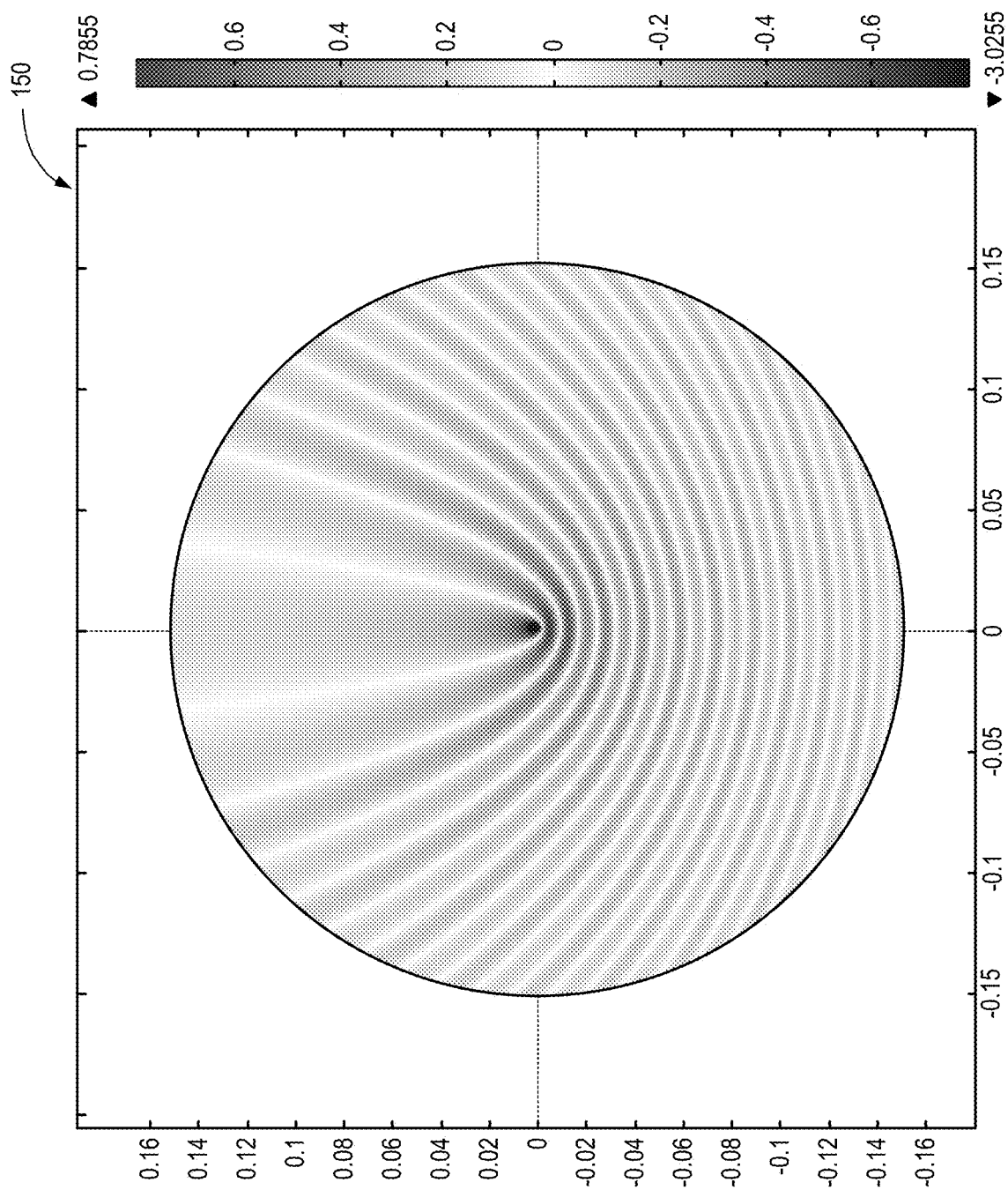
FIG. 1B illustrates an example of a holographic solution showing imaginary values of a volumetric distribution of dielectric constants for increasing the directionality of a two-dimensionally isotropic line source EMR device.

FIG. 1B illustrates the imaginary values of the volumetric distribution of dielectric constants 150 for the same line source EMR device using Equation 1 above.

The "goal" or "target" field used in Equation 1 to generate FIGS. 1A and 1B is a plane wave with infinite directivity. The example, although idealized, illustrates one method for generating a mode converting structure for converting the electromagnetic field generated by an EMR device to a second mode with improved radiation characteristics. In practice, the finite aperture of the holographic metamaterial domain limits the actual directivity that can be attained. To account for the aperture effect, another option would be to use a Gaussian beam whose waist is equal to or small than the diameter of the holographic metamaterial domain.

Figure 2A:
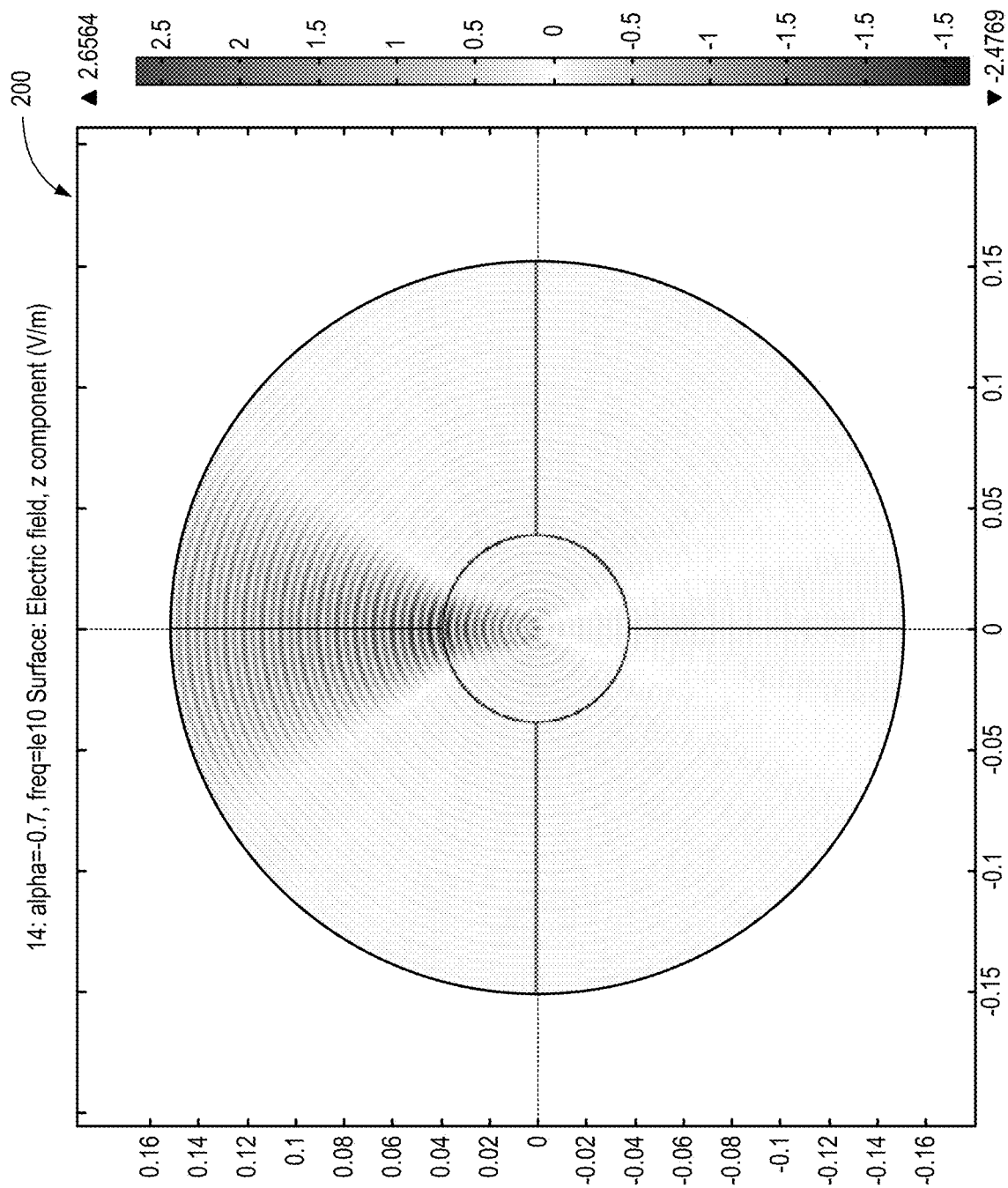
FIG. 2A illustrates an example of a field distribution of a line source EMR device surrounded by a holographic metamaterial (mode converting structure) that has a distribution of dielectric constants approximating the distribution shown in FIGS. 1A and 1B.

FIG. 2A illustrates an example of a field distribution 200 of the line source EMR device surrounded by a holographic metamaterial (mode converting structure) that has a distribution of dielectric constants approximating the distributions (real and imaginary) shown in FIGS. 1A and 1B.

Figure 2B:
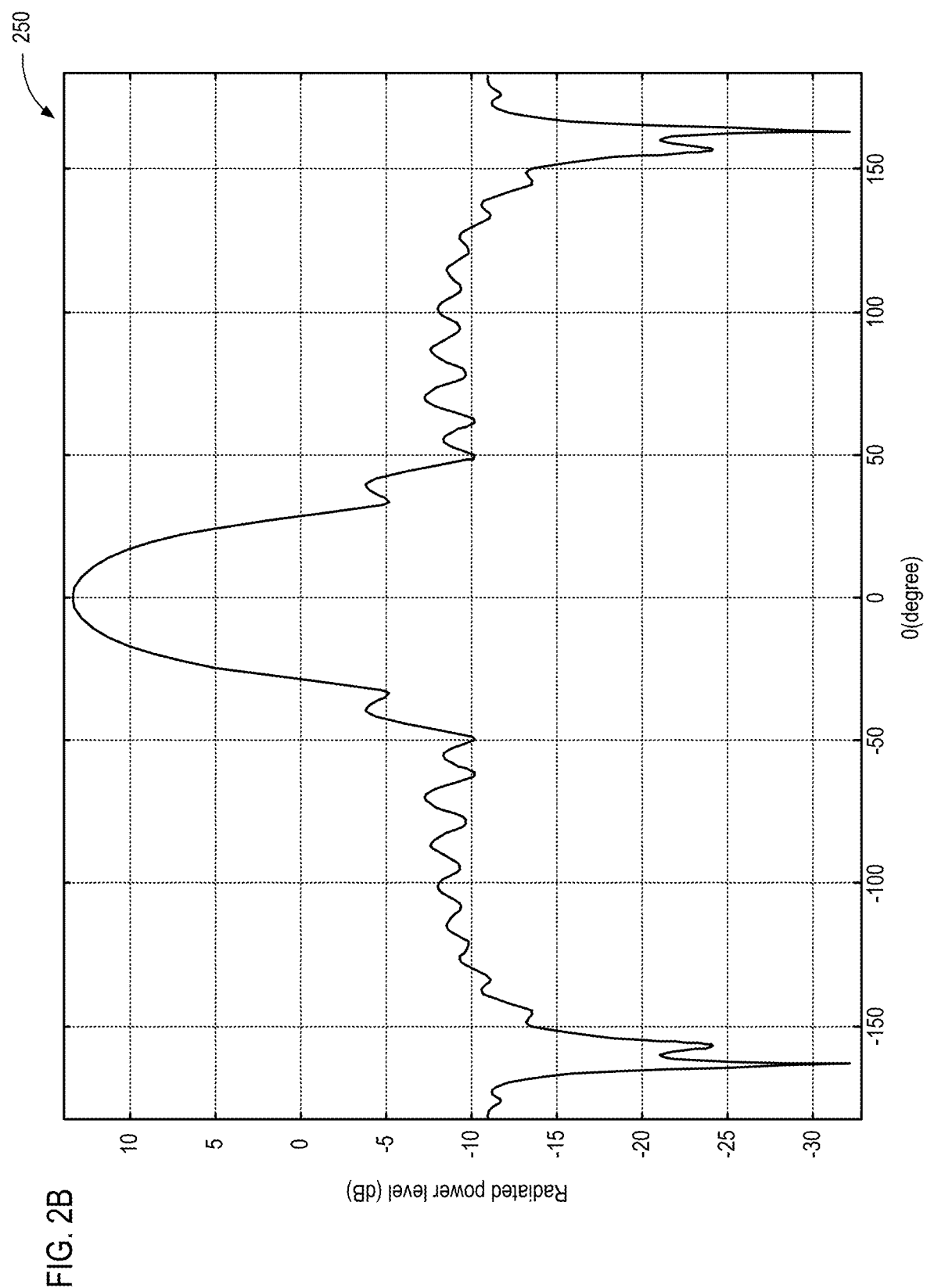
FIG. 2B illustrates an example of a far-field radiation pattern of the line source in FIG. 2A surrounded by the mode converting structure having the distribution of dielectric constants shown in FIGS. 1A and 1B.

FIG. 2B illustrates an example of a far-field radiation pattern 250 of the line source EMR device surrounded by the mode converting structure having the distribution of dielectric constants (real and imaginary) shown in FIGS. 1A and 1B.

Equation 1 above may result in a distribution of dielectric constants with complex permittivity values in all four quadrants of the complex variable plane, including the half-plane corresponding to active-gain medium, and possibly the quadrant corresponding to a passive, negative-permittivity medium. In such embodiments, active-gain permittivity values and negative permittivity values may be attainable using metamaterials. For instance, the distribution of dielectric constants can be discretized into sub-wavelength voxels each being assigned a particular permittivity value. Some of the voxels may be assigned permittivity values that can be implemented with traditional low-loss dielectrics, while other voxels may be assigned permittivity values (active-gain and negative) that can be implemented with metamaterials.

In some situations, it may be desirable to utilize low-loss dielectrics in which $\varepsilon'\geq1$ and $\varepsilon''\ll1$. Such materials may be referred to as non-superluminal low-loss dielectrics (NSLLDs). Some material may only be considered NSLLD for specific frequency bands. Accordingly, the materials used to generate a mode converting structure may depend highly on the specific frequencies and bandwidths utilized by a particular EMR device.

According to various embodiments in which it is desirous to use NSLLD materials, a sufficiently accurate approximation to Equation 1 above is given by the equation below:

$$\varepsilon_{hol}(x,y,z)-1=\beta|E_{goal}+E_{in}|^2/|E_{in}|^2 \quad \text{Equation 2}$$

In Equation 2 above, $\varepsilon_{hol}(x,y,z)$ represents a volumetric distribution of dielectric constants in an x,y,z coordinate system. Again, any coordinate system may be used that is suitable for the calculation of the distribution of dielectric constants and/or is useful for mapping a manufacturing process. $\beta$ represents a non-zero normalization constant and $E_{in}$ represents an input field distribution of EMR from an EMR device, within a waveguide or other transmission line, and/or on a coupling between a waveguide and free space on the surface of the mode converting structure relative to the x,y,z coordinate system. $E_{goal}$ represents the "goal" or selected/desired output field distribution of EMR from the mode converting structure relative to the x,y,z coordinate system.

Solving the equations above and/or other equations described herein, may be performed using an optimization algorithm in which the dielectric constants are treated as optimizable variables. The real and/or imaginary parts of the dielectric constants may be treated as independently optimizable variables, or complex values may be selected and used as the optimizable variables. Any of a wide variety of optimization algorithms may be used, including those (1) in which a cost function is determined for each modification or group of modifications, (2) in which a gradient of a cost function based on partial derivatives is made with respect to each of the optimizable variable, and (3) in which a sensitivity vector is calculated using an adjoint sensitivity algorithm.

In some embodiments, a constrained optimization algorithm may be used in which the dielectric constants are treated as optimization variables constrained to have real parts greater than or equal to approximately N and imaginary parts equal to approximately M, where N and M are real numbers. In other embodiments, a guess-and-check approach may be used in which an initial guess is used to solve the holographic solution using any one of the equations described herein. Non-exhaustive examples of specific optimization algorithms are described in greater detail below.

Figure 3:
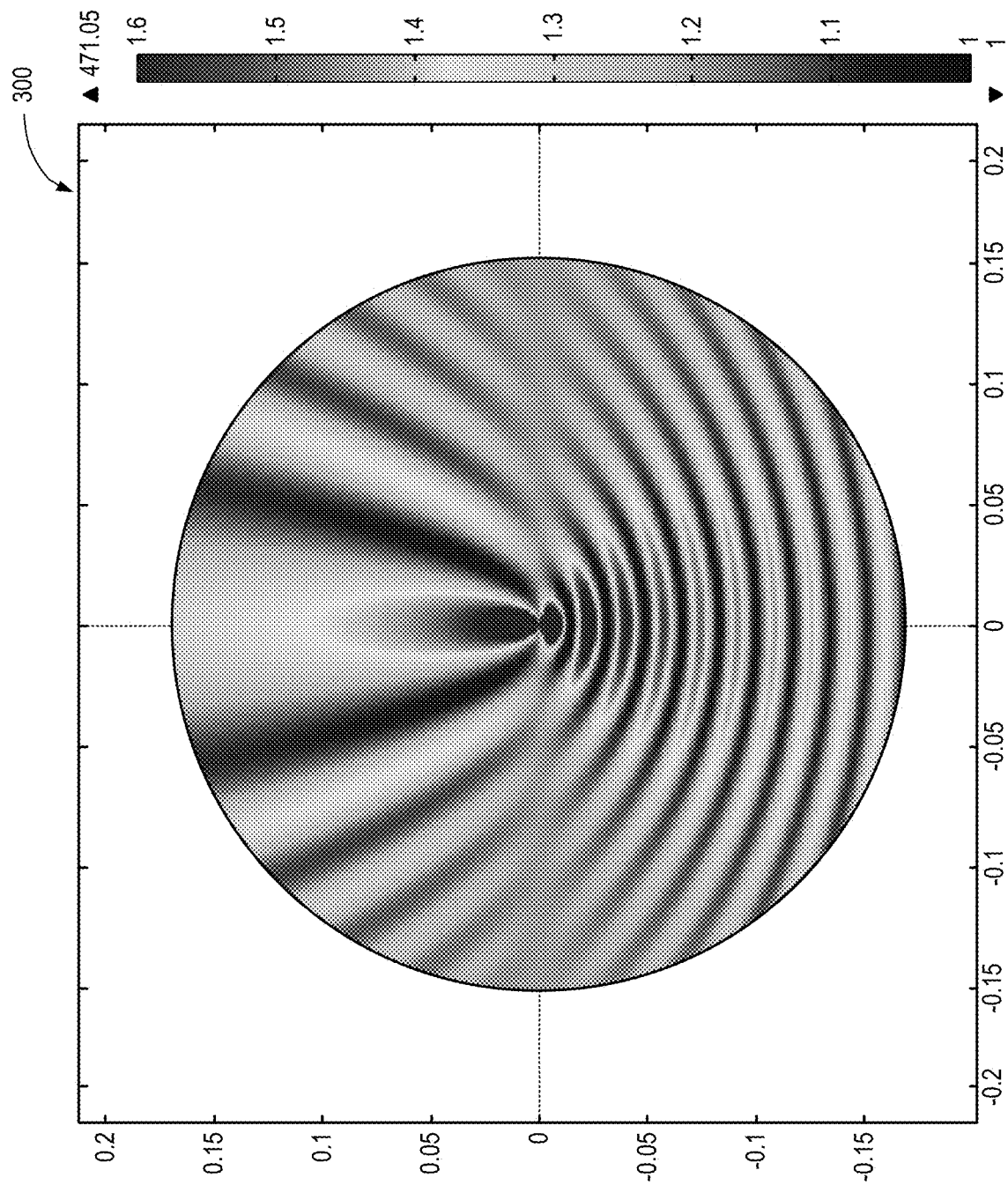
FIG. 3 illustrates an example of a volumetric distribution of dielectric constants for converting a radiation pattern of a two-dimensional point dipole antenna into a directional beam.

FIG. 3 illustrates an example of a volumetric distribution of dielectric constants 300 for converting a radiation pattern of a two-dimensional point dipole antenna into a directional beam. The distribution of dielectric constants illustrated in FIG. 3 is found using Equation 2 above, with the target or goal output field set as a plan wave. For the purposes of this calculation, the plane wave would be indistinguishable from a finite-width beam, given the finite diameter of the metamaterial domain used.

Figure 4A:
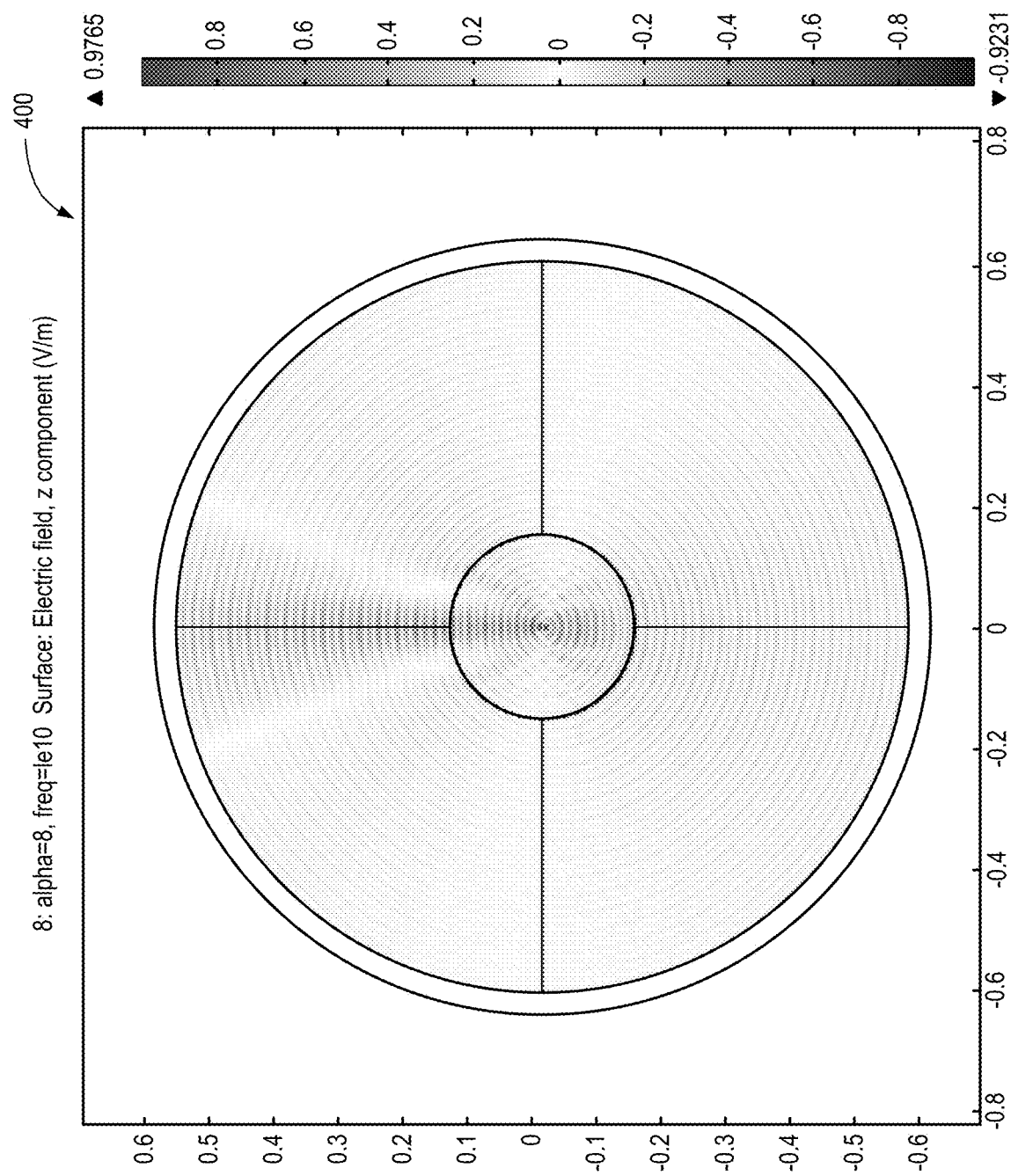
FIG. 4A illustrates an example of a field distribution of a two-dimensional point-dipole antenna surrounded by a mode converting structure that has a distribution of dielectric constants approximating the distribution shown in FIG. 3.

FIG. 4A illustrates an example of a field distribution 400 of a two-dimensional point-dipole antenna surrounded by a mode converting structure that has a distribution of dielectric constants approximating the distribution shown in FIG. 3.

Figure 4B:
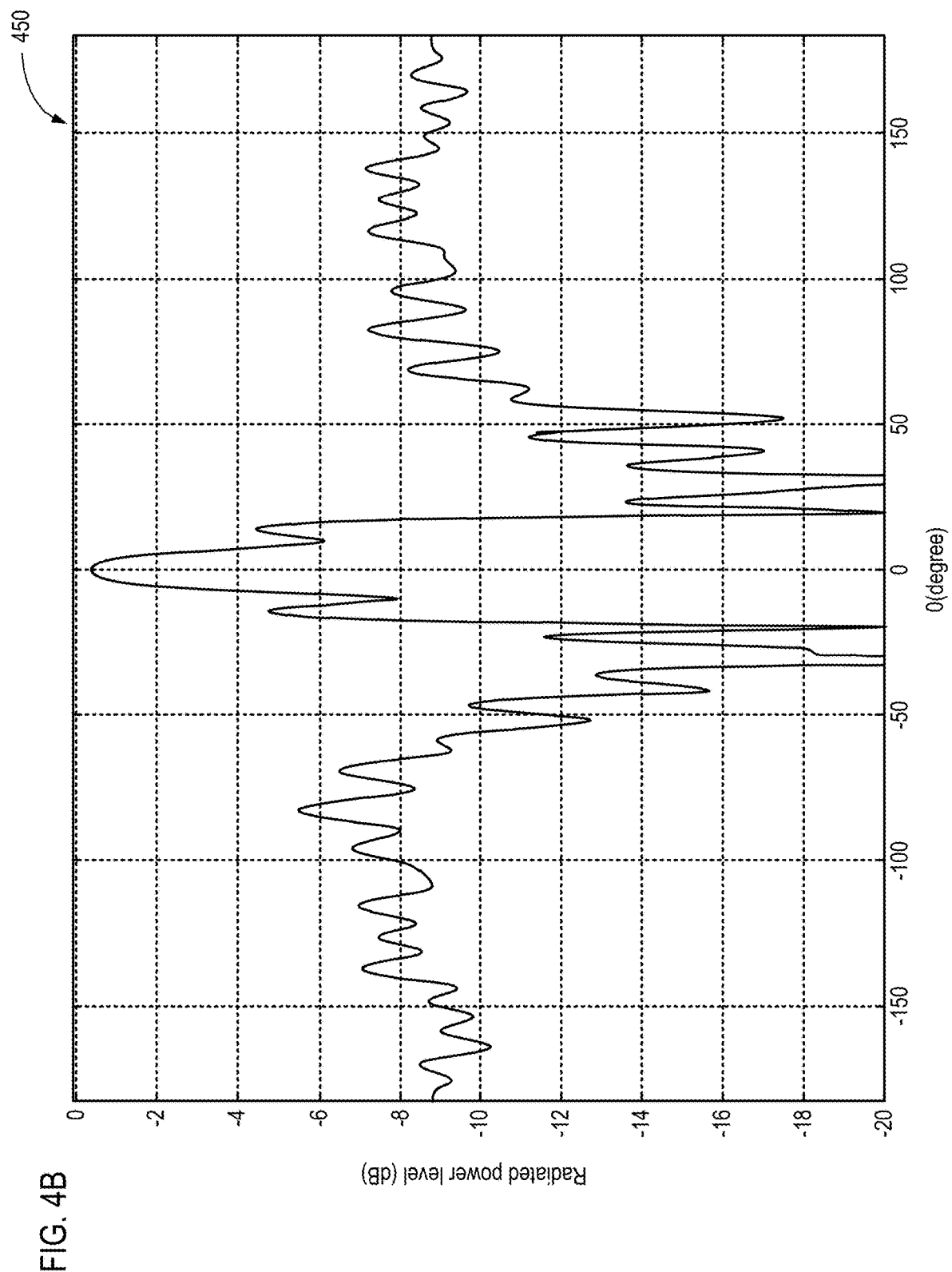
FIG. 4B illustrates an example of a far-field radiation pattern of the two-dimensional point dipole antenna in FIG. 4A surrounded by the mode converting structure having the distribution of dielectric constants shown in FIG. 3.

FIG. 4B illustrates an example of a far-field radiation pattern 450 of the two-dimensional point dipole antenna in FIG. 4A surrounded by the mode converting structure having the distribution of dielectric constants shown in FIG. 3.

Equations 1 and 2 above provide adequate solutions to finding distributions of dielectric constants for generating mode converting structures. However, further optimization may improve the efficiency of the mode conversion and compensate for the finite metamaterial domain. The metamaterial domain may be conceptually split into a plurality of voxels, where each voxel is approximately less than one-half wavelength (e.g., one-tenth of a wavelength). Each voxel may be conceptually populated with a spatial average of the continuous dielectric constant found using Equation 1 or 2 above. This discrete distribution of dielectric constants may be used as an initial guess in an optimization algorithm. The optimization algorithm may treat the real and imaginary values of the dielectric constant in each voxel as independent control variables. Alternatively, the complex (or real) value in each voxel may be treated as an independent value.

Any of a wide variety of optimization algorithms may be used. For example, a small perturbation to one of the control variables may be made, and then the forward wave propagation problem may be solved to determine the effect of the perturbation. This may be referred to as a cost function optimization in which the cost function is the difference between the target or goal field and the field produced by the current state of the optimization variables. The finite difference in the goal, divided by the small perturbation value of the control variable, may be referred to as the finite-difference estimate of the cost function partial derivative. After computing all of the partial derivatives with respect to all control variables, the combined vector may be referred to as the "gradient" of the cost function, also known as "a sensitivity vector."

In other embodiments or as an alternative in the same embodiments, an adjoint method may be used that is based on the analytical derivatives of the equation describing the forward problem. The adjoint method may be used to produce the entire sensitivity vector after solving just one auxiliary problem known as the adjoint problem, whose computational complexity is the same as the complexity of one forward problem of the same size. In some applications, this may reduce the amount of computation per optimization step by a factor of N, where N is the number of control variables.

Once a sensitivity vector is obtained, an iteration of a standard Newton, damped Newton, conjugate-gradient, or any other gradient-based iterative nonlinear solver may be used to determine the next configuration.

In some embodiments the optimization algorithms may use heuristics as part of the optimization process. This may be useful in embodiments where the control variables are non-differentiable. In those embodiments it may be difficult to determine the gradient of the sensitivity vector or the analytic derivative. For example, in some embodiments, the optimization algorithm may use iterative heuristic optimization techniques such as, particle swarm optimization (PSO) or genetic optimization to determine an optimal solution.

In one embodiment the iterative heuristic optimization may begin by generating a family of possible solutions. The family of possible solutions may contain thousands or millions of possible optimal solutions. Each, of the possible solutions may be generated according to a predetermined representation of the optimal solution domain. In other embodiments the predetermined solutions may be generated randomly. The predetermined representation may include properties of the optimal solution (e.g., transmission mode, manufacturing constraints, dielectric properties, boundary conditions, or optimization variables).

With each iteration of the heuristic optimization process the possible solutions may be evaluated using a fitness function. Solutions that are "more fit", as determined by the fitness function, may be stochastically selected to continue on to the next iteration. Each, iteration may add new possible solutions or remove less fit solutions. In addition, with each successive iteration properties of each solution may be modified, altered, mutated, exchanged, updated, or changed in any way or combination of ways useful in determining an optimal solution. The algorithm may iterate a finite number of times or it may iterate until an acceptable solution is reached.

An optimization algorithm may be utilized until a predetermined termination tolerance(s) is met. A termination condition can be imposed on some norm of the sensitivity vector, in which case the optimization algorithm is guaranteed to converge. A termination condition can be imposed as an inequality on the scalar value of the cost function, in which case the algorithm may fail to meet the imposed condition. In various embodiments, it may be useful to apply a termination condition to a sensitivity vector, and to take the final value of the optimization cost function as an output of the algorithm instead of an input to the algorithm.

For applications that require the final value of the cost function to be below a certain tolerance, the optimization loop that failed to produce such an outcome can be repeated with a different initial guess. Each of Equations 1 and 2 define a family of initial guesses, each of which can be used to initiate a different optimization loop. Such loops are entirely independent and can be computed in parallel, using distributed computing.

Figure 5:
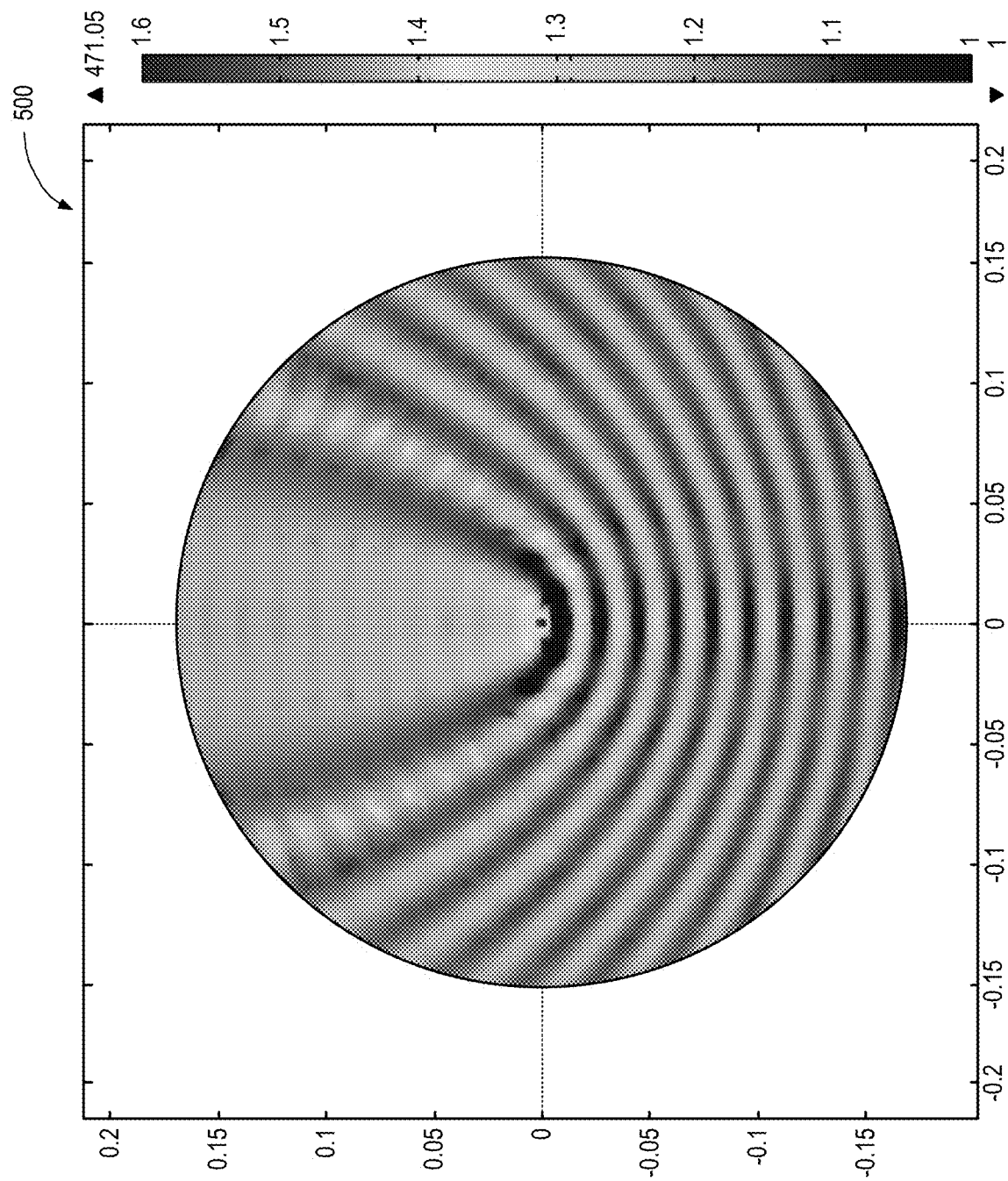
FIG. 5 illustrates an example of an optimized volumetric distribution of dielectric constants generated by optimizing the solution shown in FIG. 1A.

FIG. 5 illustrates the optimization 500 of the real part of the dielectric constant distribution shown in FIG. 1A using the adjoint sensitivity method and a conjugate-gradient nonlinear solver. In the illustrated optimized dielectric constant distribution, discretized values from FIG. 1A are used as an initial guess. The optimization algorithm converged to the solution shown in FIG. 5.

Figure 6A:
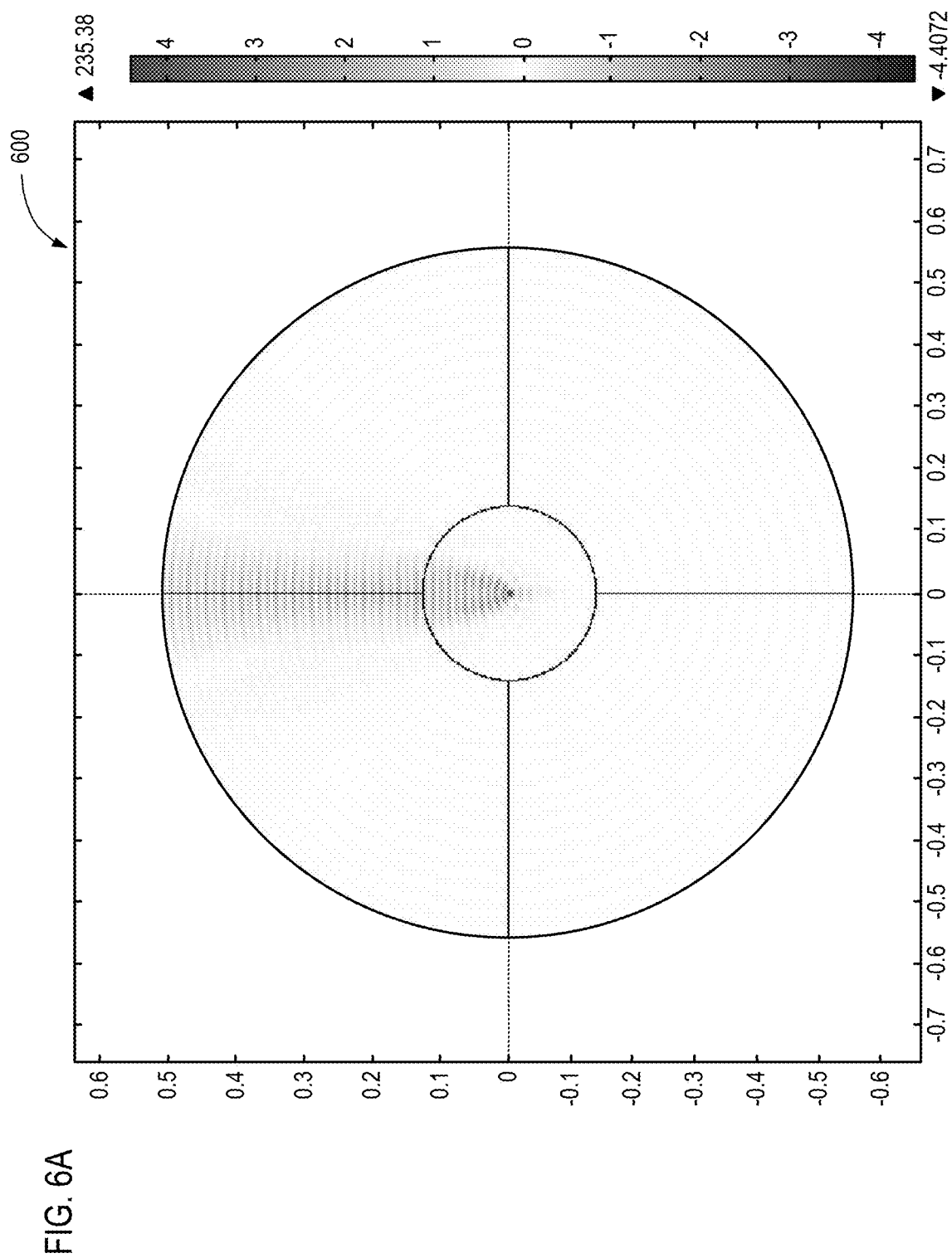
FIG. 6A illustrates an example of a field distribution of the two-dimensionally isotropic line source EMR device surrounded by a mode converting structure that has a distribution of dielectric constants approximating the distribution shown in FIG. 5.

FIG. 6A illustrates an example of a field distribution 600 of the two-dimensionally isotropic line source EMR device surrounded by a mode converting structure that has a distribution of dielectric constants approximating the optimized distribution shown in FIG. 5.

Figure 6B:
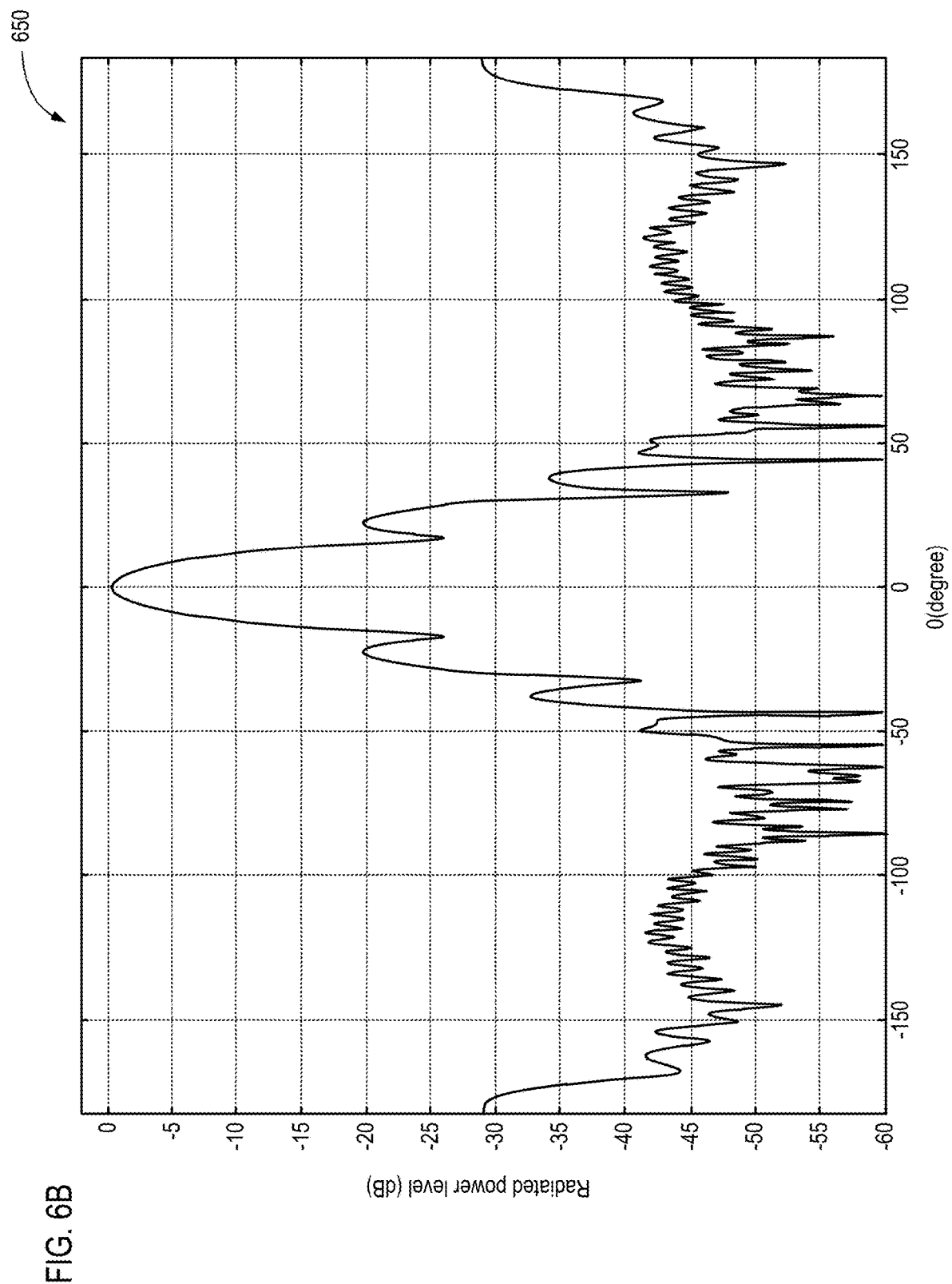
FIG. 6B illustrates an example of a far-field radiation pattern of the two-dimensionally isotropic line source EMR device in FIG. 6A surrounded by the mode converting structure having the distribution of dielectric constants shown in FIG. 5.

FIG. 6B illustrates an example of a far-field radiation pattern 650 of the two-dimensionally isotropic line source EMR device surrounded by the mode converting structure having the optimized distribution of dielectric constants shown in FIG. 5. Comparison of FIG. 6A with FIG. 2A and FIG. 6B with FIG. 2B show the improvement in mode conversion efficiency of the optimized solution.

Figure 7:
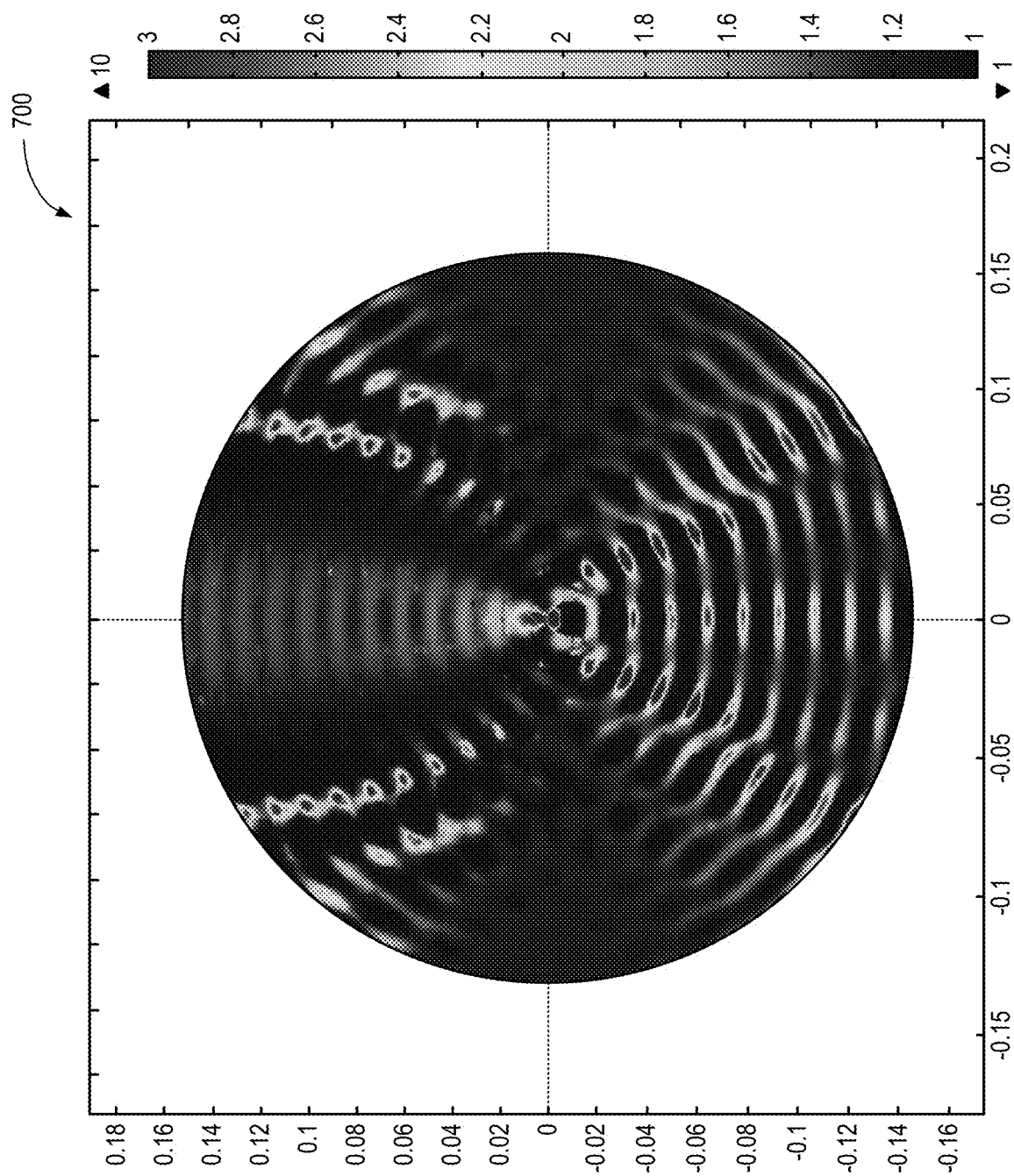
FIG. 7 illustrates an example of an optimized volumetric distribution of dielectric constants generated by optimizing the solution shown in FIG. 3.

FIG. 7 illustrates the optimization 700 of the dielectric constant distribution shown in FIG. 3 using the adjoint sensitivity method and a conjugate-gradient nonlinear solver. In the illustrated optimized dielectric constant distribution, discretized values from FIG. 3 are used as an initial guess. The optimization algorithm converged to the solution shown in FIG. 7.

Figure 8A:
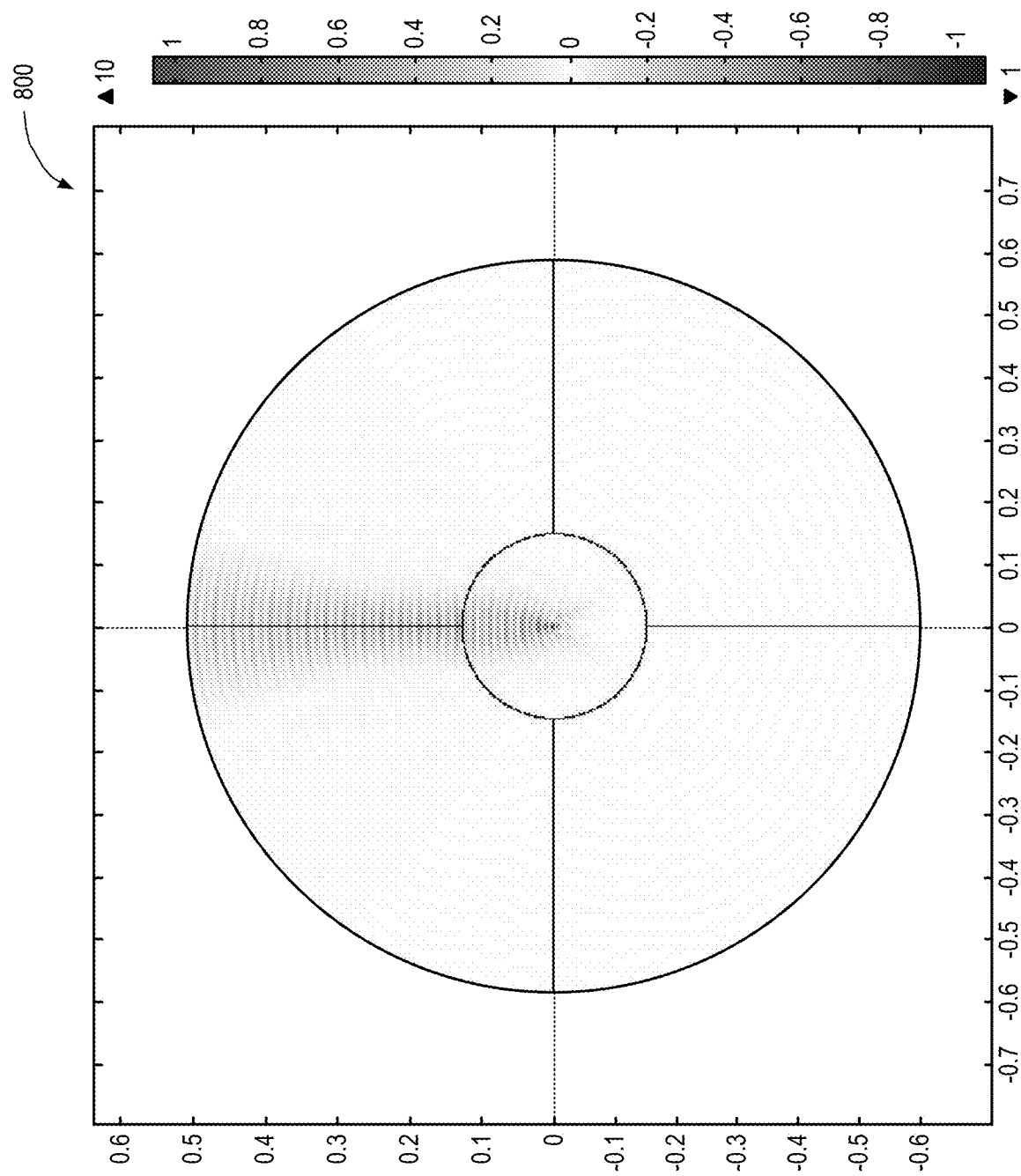
FIG. 8A illustrates an example of a field distribution of the two-dimensional point dipole antenna surrounded by a mode converting structure that has a distribution of dielectric constants approximating the distribution shown in FIG. 7.

FIG. 8A illustrates an example of a field distribution 800 of the two-dimensional point dipole antenna surrounded by a mode converting structure that has a distribution of dielectric constants approximating the optimized distribution shown in FIG. 7.

Figure 8B:
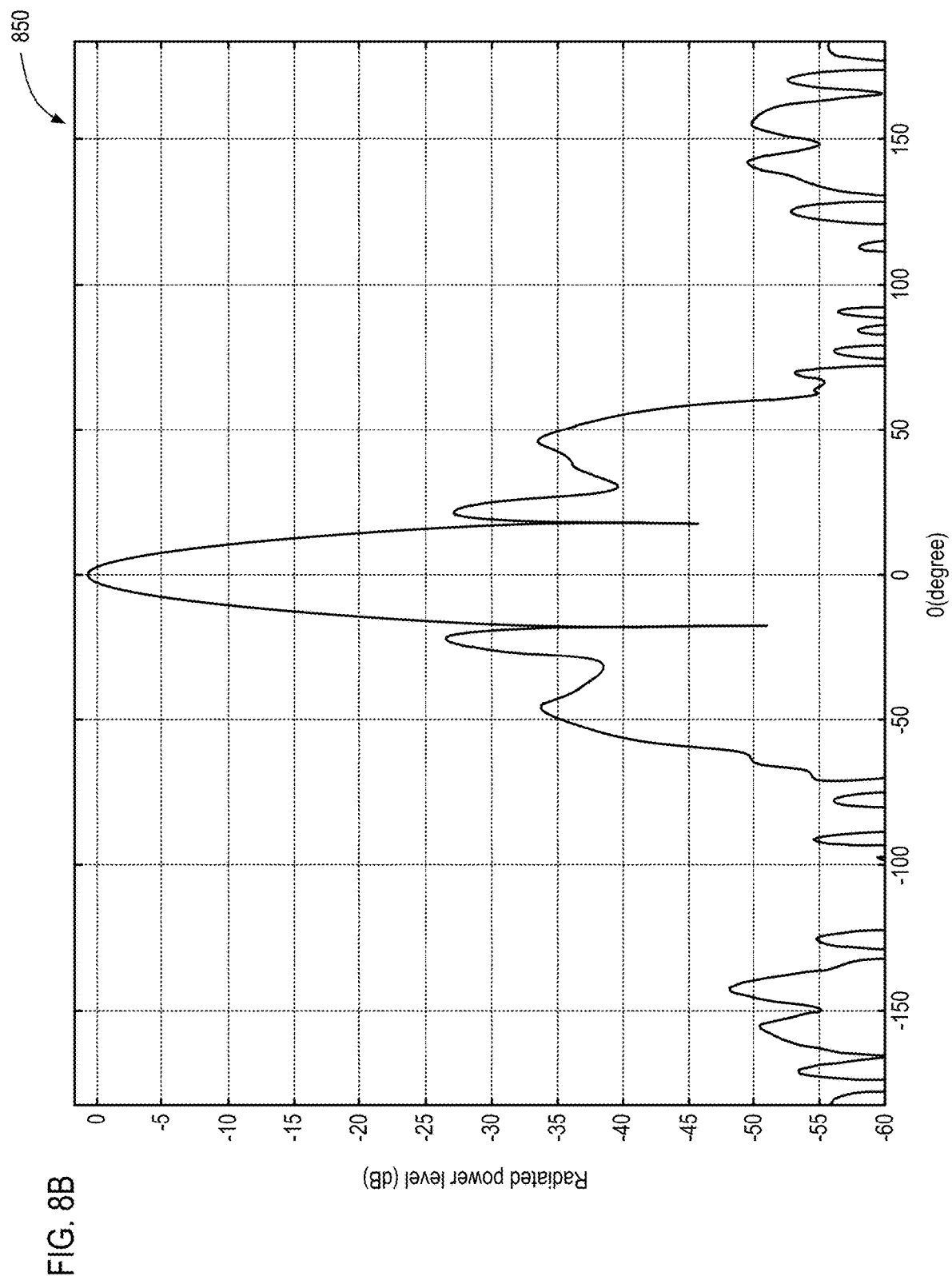
FIG. 8B illustrates an example of a far-field radiation pattern of the two-dimensional point dipole antenna in FIG. 8A surrounded by the mode converting structure having the distribution of dielectric constants shown in FIG. 7.

FIG. 8B illustrates an example of a far-field radiation pattern 850 of the two-dimensional point dipole antenna in FIG. 8A surrounded by the mode converting structure having the optimized distribution of dielectric constants shown in FIG. 7. Comparison of FIG. 8A with FIG. 4A and FIG. 8B with FIG. 4B show the improvement in mode conversion efficiency of the optimized solution.

The conceptual voxels described above are assigned a discrete permittivity value; however, the total number of unique values is unlimited as each one may be any real (or potentially complex) value. In some embodiments, it may be useful to limit the total number of unique values.

Thus, instead of assigning each voxel a value based on the spatial average, $\varepsilon_{av}$, of the continuous distribution over that region, each voxel could be assigned, as a binary example, one of two values, $\varepsilon_1$ or $\varepsilon_2$. For instance, each voxel may either be assigned a permittivity value of "1" or "X", where 1 represents a vacuum and X represents a permittivity value greater than 1. Such a binary discretization may be thought of as similar to gray-scale imaging where only white and black dithering is used.

The Boolean decision to assign each voxel to either $\varepsilon_1$ or $\varepsilon_2$ may be based on whether $\varepsilon_{av}$ is above or below a threshold value. The result may be considered a piecewise-constant distribution of dielectric constants. So long as the feature sizes of each voxel are sufficiently small (sub-wavelength at a minimum), the mode converting structure may be electromagnetically equivalent to a continuous distribution for a given bandwidth. In various embodiments, the piecewise-constant distribution of dielectric constants may be binary, ternary, or quaternary in nature, or otherwise limited to a specific number of unique permittivity values.

Thus, in some embodiments, Equation 1 and/or 2 may be used to determine a continuous distribution of dielectric constants. Optimization algorithms may then be employed using discretized average permittivity values. A mode converting structure may then be manufactured using the discretized distribution of optimized average permittivity values.

In some embodiments, Equation 1 and/or 2 may be used to determine a continuous distribution of dielectric constants. Optimization algorithms may then be employed using discretized average permittivity values. The discretized average permittivity values may then be discretized into N values for an N-ary discretization (where N is 2 for binary discretization, 3 for ternary discretization, and so forth). A mode converting structure may then be manufactured using the discretized distribution of optimized N-ary permittivity values. For example, an N-material three-dimensional printer may be used to deposit a material with one of the N permittivity values in each respective voxel.

In some embodiments, Equation 1 and/or 2 may be used to determine a continuous distribution of dielectric constants. The continuous distribution of dielectric constants may be discretized into N values for an N-ary discretization (where N is 2 for binary discretization, 3 for ternary discretization, and so forth). Optimization algorithms may then be employed using the N-ary discretized average permittivity values. A mode converting structure may then be manufactured using the discretized distribution of optimized N-ary permittivity values.

In embodiments in which the piecewise-constant distribution is used in the optimization algorithms, it may be desirable to preserve the ability to use real-valued control variables while still accounting for the N-ary nature of the structures being optimized. An algebraic transformation may be used to map the real-valued control variable to the N-ary-valued dielectric constants. An example of such a transformation for a binary piecewise-constant distribution with permittivity values $\varepsilon_1$ and $\varepsilon_2$ is as follows:

$$\varepsilon(x,y,z) = \varepsilon_1 + (\varepsilon_2 - \varepsilon_1)\theta_\delta(p(x,y,z)) \quad \text{Transformation 1}$$

In Transformation 1, p(x,y,z) is a real-valued function of coordinates with values bounded to the [−1; 1] interval (called the level-set function), and $\theta_\delta(p)$ is a smoothed Heaviside function, which, by definition, is equal to zero for p<−δ, unity for p>δ, and is continuous with its first (and possibly second) derivatives for all p. The value of the smoothing parameter δ may be chosen as 0.1; however, this value can be selected differently based on the specific application to achieve more accurate results.

The transformation allows optimization algorithms designed for continuous, real-valued control variables to be used for N-ary discretized approximations by using near-N-ary values as realistic approximations to N-ary values.

After optimization has been performed, the values may be converted back into discretized N-ary values based on whether each optimized value is above or below one or more threshold values, where the number of threshold values is equal to N−1.

Figure 9A:
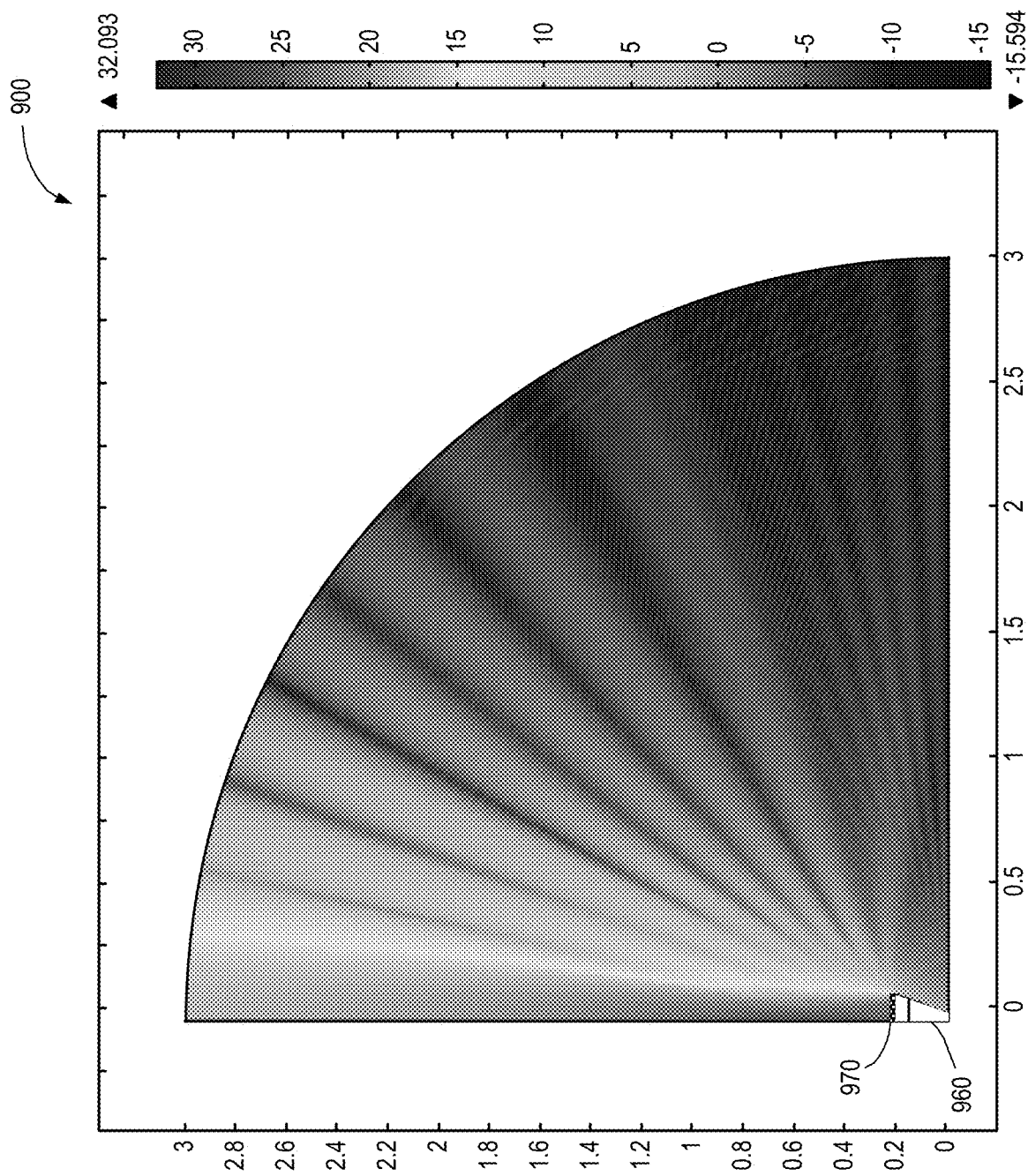
FIG. 9A illustrates an example of a radiation intensity pattern of a circular horn antenna enhanced with an optimized binary mode converting structure.

FIG. 9A illustrates an example of a radiation intensity pattern 900 of a circular horn antenna 960 enhanced with an optimized binary mode converting structure 970 (i.e., holographic metamaterial). Again, the goal field can be set as a plane wave.

Figure 9B:
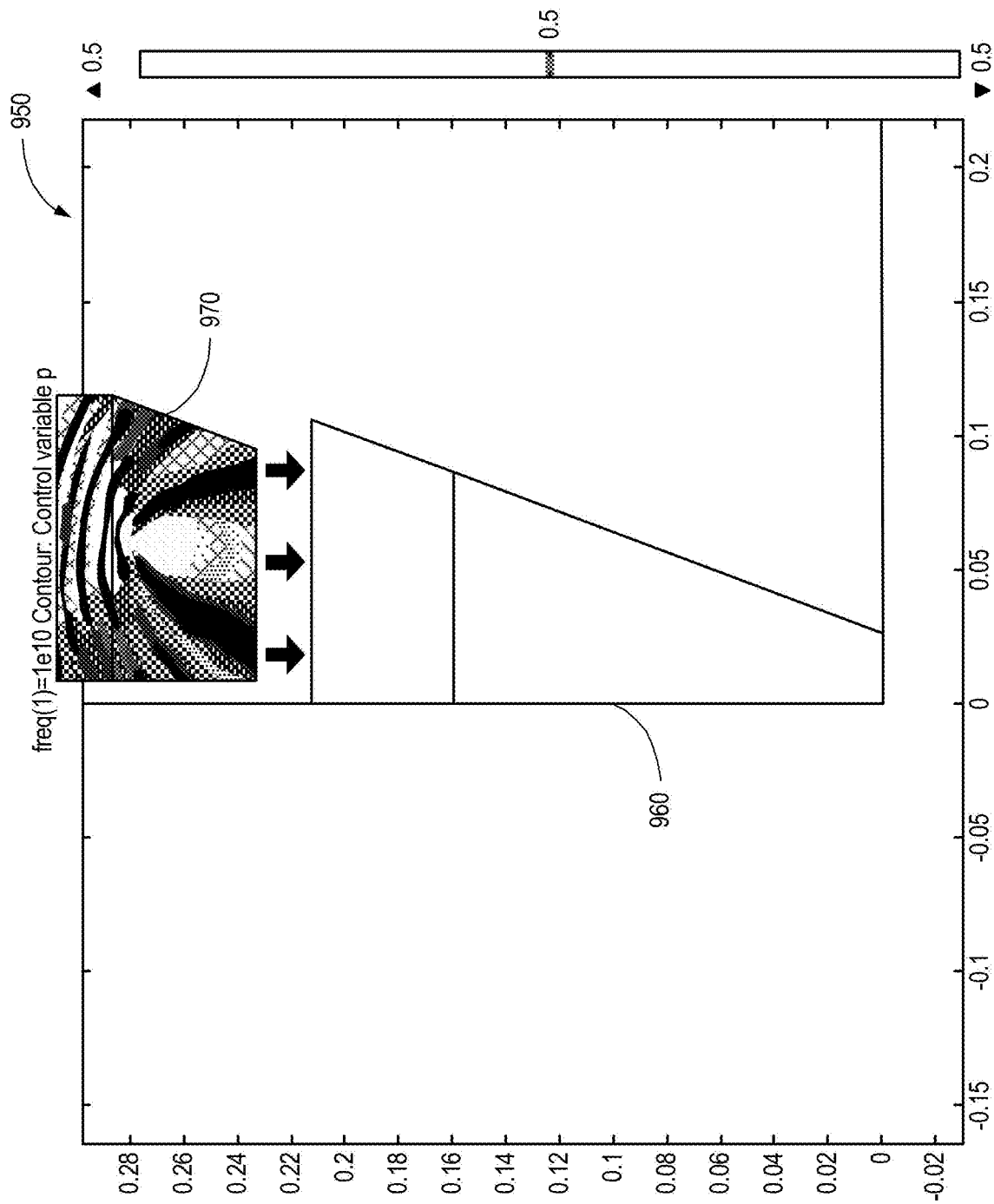
FIG. 9B illustrates an example of a mode converting structure optimized with a binary volumetric distribution of dielectric constants configured to be inserted into a horn antenna.

FIG. 9B illustrates an representation of a mode converting structure 970 optimized with a binary volumetric distribution of dielectric constants configured to be inserted into the horn antenna 960. The binary volumetric distribution of dielectric constants is illustrated as various grayscale patterns to show that average dielectric constants over any given region may be a factor of the ratio of voxels assigned $\varepsilon_1$ (shown as white) and $\varepsilon_2$ (shown as black). It can be appreciated that for a ternary or other N-ary embodiment, additional colors might be used to represent the various possible discretization alternatives and approximations.

Figure 9C:
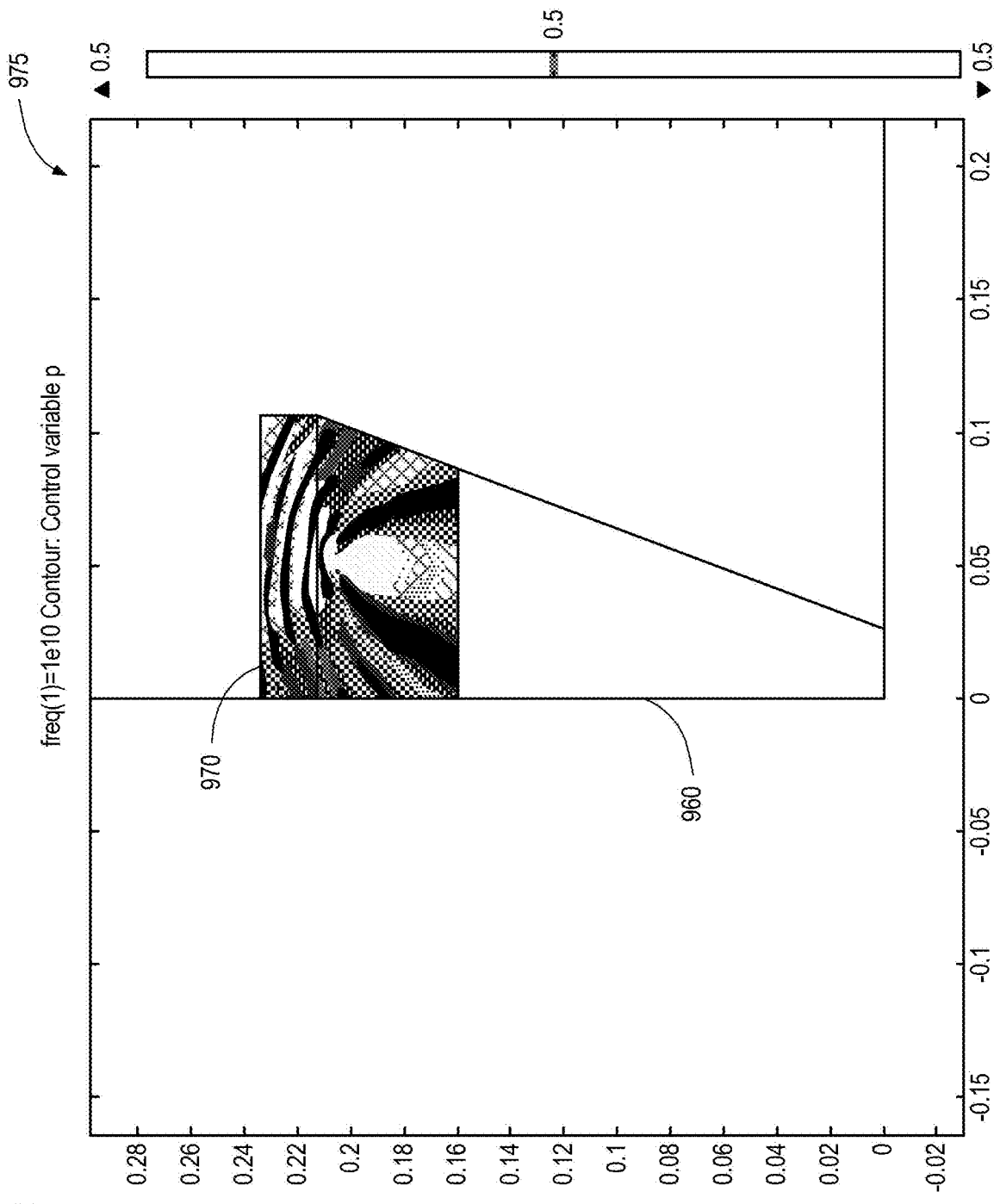
FIG. 9C illustrates the binary optimized mode converting structure inserted into the horn antenna.

FIG. 9C illustrates the binary optimized mode converting structure 970 inserted into the horn antenna 960. As illustrated, the mode converting structure 970 may be specifically manufactured (i.e., a volumetric boundary may be imposed) so that it limits the total width to no wider than the maximum width of the horn antenna 960. In the illustrated embodiment, the volumetric boundary allows the mode converting structure 970 to protrude from the horn by a small amount.

Figure 10:
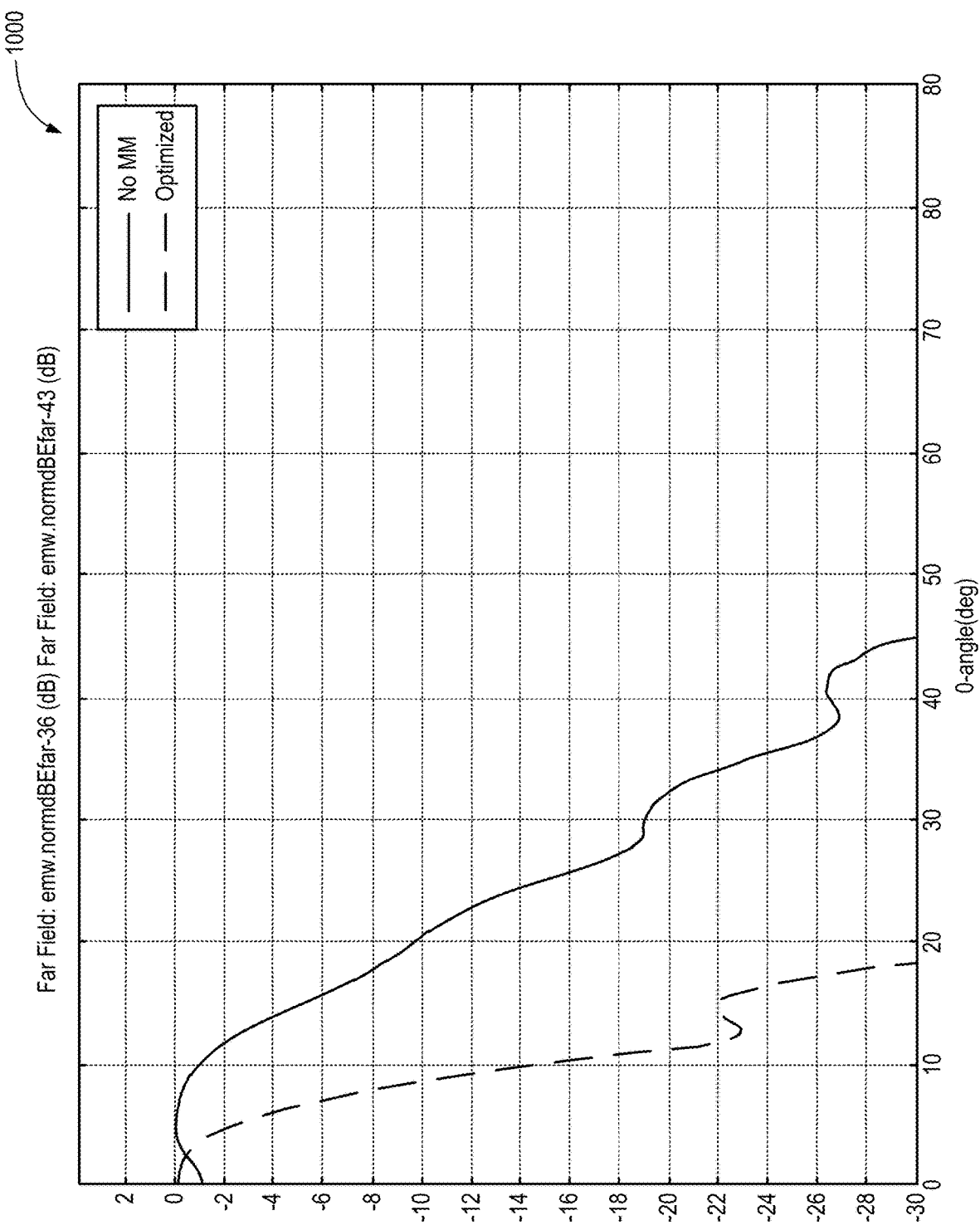
FIG. 10 illustrates a directivity comparison of a typical horn antenna and an enhanced circular horn antenna with the binary optimized mode converting structure insert in place.

FIG. 10 illustrates a directivity comparison 1000 of a typical horn antenna (shown as a solid line) and an enhanced circular horn antenna (shown as a dashed line) with the binary optimized mode converting structure insert in place. As illustrated, the binary optimized mode converting structure provides a mode conversion with increased directivity.

The equations above describe an x,y,z coordinate system. Many possible variations of Equations 1 and 2 are possible and may be utilized in combination with the discretization and optimization techniques described herein. A variation of Equation 1 that may be used is provided below:

$$\varepsilon_{hol} - 1 = \beta E_{goal} \cdot E_{in}^* / |E_{in}|^2 \quad \text{Equation 3}$$

In Equation 3 above, $\varepsilon_{hol}$ represents a volumetric distribution of dielectric constants in any of a wide variety of three-dimensional coordinate systems. Similar to Equation 1, represents a normalization constant and $E_{in}$ represents an input field distribution of EMR on a mode converting waveguide junction (free space or other transmission line) or from an EMR device on the surface of the mode converting structure relative to the three-dimensional coordinate system. $E_{goal}$ represents a selected or desired output field distribution of EMR from the mode converting structure relative to the three-dimensional coordinate system.

In some embodiments, the holographic solutions to the equations described herein may be calculated with the electric field decomposed into $TE_z$ or $TM_z$ mode in cylindrical coordinates and/or the dominant component of the $TE_z$ or $TM_z$ mode may be used in the holographic solution.

As previously described, the mode converting structure may be configured and/or adapted for use with any of a wide variety of EMR devices, including but not limited to the following list of devices that are not necessarily mutually exclusive: a short dipole antenna, a dipole antenna, a horn antenna, a circular horn antenna, a metamaterial surface antenna technology (MSAT) device, a parabolic reflector, a monopole antenna, a dipole antenna, a half-wave dipole antenna, a monopole antenna, a folded dipole antenna, a loop antenna, a bowtie antenna, a log-periodic antenna, a slot antenna, a cavity-backed slot antenna, an inverted-F antenna, a slotted waveguide antenna, a waveguide, a Vivaldi antenna, a telescope, a helical antenna, a Yagi-Uda antenna system, a spiral antenna, a corner reflector, a parabolic reflector, a microstrip antenna, and a planar inverted-F antenna (PIFA)

The mode converting structure may be adapted to electromagnetically and/or mechanically couple to any of a wide variety of transmission lines (where a waveguide is one type of transmission line). Examples of such transmission lines include: hollow metal, circular pipe waveguides, rectangular waveguides, circular waveguides, elliptic waveguides, triangular waveguides, hexagonal waveguides, curved waveguides, dielectric waveguides, surface-wave waveguides, leaky waveguides, parallel lines, ladder transmission lines, twisted pair lines, star quad lines, coaxial cables, striplines, and microstrips.

In other embodiments, a mode converting structure may be adapted to electromagnetically and/or mechanically couple one or more of: a dielectric waveguide, a leaky dielectric waveguide, an optical fiber, a multimode optical fiber, a multicore optical fiber, a plasmonic waveguide, a leaky plasmonic waveguide, a surface plasmon waveguide, and an optical polariton waveguide.

In some embodiments, a variation of Equation 2 may be used as provided below:

$$\varepsilon_{hol}-1=\beta|E_{goal}+E_{in}|^2/|E_{in}|^2 \qquad \text{Equation 4}$$

In Equation 4 above, $\varepsilon_{hol}$ represents a volumetric distribution of dielectric constants in any of a wide variety of three-dimensional coordinate systems. Similar to Equation 1, $\beta$ represents a normalization constant and $E_{in}$ represents an input field distribution of EMR on a mode converting waveguide junction, at a waveguide termination, or from an EMR device on the surface of the mode converting structure relative to the three-dimensional coordinate system. $E_{goal}$ represents a selected or desired output field distribution of EMR from the mode converting structure relative to the three-dimensional coordinate system.

In any of the embodiments described herein, values for $\varepsilon_{hol}$ below a minimum threshold value may be set to a predetermined minimum value. Similarly, values for $\varepsilon_{hol}$ above a maximum threshold value may be set to a predetermined maximum value. In other embodiments, a plurality of discrete values for $\varepsilon_{hol}$ may be available and each of the calculated values of $\varepsilon_{hol}$ may be assigned one of the available discrete values by rounding down to the nearest available value, rounding up to the nearest available value, and/or assigned to the closest matching value.

As previously described, many variations of Equations 1 and 2 may be used to find the holographic solution and calculate the volumetric distribution of dielectric constants. Another example of such an equation is provided below:

$$\varepsilon_{hol}(x,y,z)=\alpha+\beta E_{goal} \cdot E_{in}^*/|E_{in}|^2 \qquad \text{Equation 5}$$

In Equation 5 above, $\varepsilon_{hol}(x,y,z)$ represents a volumetric distribution of dielectric constants in an x,y,z coordinate system. $\alpha$ and $\beta$ represent selectable constants and $E_{in}$ represents an input field distribution of EMR from an EMR device on the surface of the mode converting structure relative to the x,y,z coordinate system. $E_{goal}$ represents the "goal" or selected/desired output field distribution of EMR from the mode converting structure relative to the x,y,z coordinate system.

It is appreciated, without exhaustive recitation herein, that any of the variations, embodiments, or methods for solving a holographic solution or equation described herein may be used in conjunction with any of the other variations, embodiments, or methods of any other holographic solution or equation.

In Equation 5, a value for a may be selected to optimize impedance matching between the input mode and a mode-converting medium. A value a may be selected to optimize impedance matching between the mode-converting medium and the output mode. A value a may be selected to maintain a minimum value for $\varepsilon_{hol}$, maintain $\varepsilon_{hol}$ greater than 0, or maintain $\varepsilon_{hol}$ greater than 1.

As previously described, the mode converting structure may include one or more metamaterials that have dielectric constants for a particular frequency range. In some embodiments, physically small metamaterials may be conglomerated to produce a sub-wavelength metamaterial conglomerate with a specific dielectric constant.

The mode converting structure may be fabricated using any of a wide variety of materials. In many embodiments, the mode converting structure may be purely dielectric in nature and/or may be composed substantially of NSLLDs. In other embodiments, the mode converting structure may comprise substantially dielectric material or mostly dielectric materials. In still other embodiments, conductors may be utilized to achieve a particular output radiation pattern.

In various embodiments, a mode converting structure may be fabricated with a calculated distribution of dielectric constants using one or more of amalgam compounding, material lamination, injection molding processes, extrusion, foaming, compression molding, vacuum forming, blow molding, rotational molding, casting, rotocasting, spin casting, machining, layer deposition, chemical etching, and dip molding. A mode converting structure may be fabricated using one or more of a silica, polymers, glass-forming materials, a metamaterial, porcelain, glass, plastic, air, nitrogen, sulfur hexafluoride, parylene, mineral oil, ceramic, paper, mica, polyethylene, aluminum oxide, and/or other material.

In various embodiments, an initial step may be to identify a target field pattern for an EMR device. Dimensional constraints may be identified for a mode converting structure. For example, it may be desirable that the mode converting structure have substantially the same profile or shape as the underlying EMR device. As a specific example, it might be desirable that a mode converting structure fit into a cavity of a horn antenna, as shown and described in conjunction with FIGS. 9A-9C above. In another embodiment, it might be desirable that the mode converting structure be configured to replace or supplement an existing radome or protective cover associated with the EMR device. Any of a wide variety of volumetric constraints may be imposed. The mode converting structure can be manufactured to accommodate identified boundaries of a three-dimensional volume.

An input field distribution of EMR may be identified that will interact with a surface of the mode converting structure. That is, an input field may be identified at any number of points, planes, or other potential surfaces within the identified three-dimensional boundaries, within which a generated mode converting structure is or may be positioned.

A mode converting structure can be manufactured that has the physical dimensions that fit within the identified three-dimensional volume and a volumetric distribution of dielectric constants that will convert the field to a second mode that approximates the target field pattern. In some embodiments, the entity that makes the calculations, measurements, identifications, and determinations may be different from the entity that actually manufactures the mode converting structure.

For example, a first entity may provide information to help in identifying the target field pattern, the physical dimensions of a desired mode converting structure, and/or the input field distribution of EMR. A second entity may use this provided information to identify the actual target field, input field, and dimensional constraints for the purposes of the calculations. The second entity may then identify (i.e., calculate, estimate, and/or otherwise determine) a volumetric distribution of constants.

The volumetric distribution of dielectric constants may be transmitted to the first party or a third party for manufacture of the mode converting structure. Alternatively, the second party may also manufacture the mode converting structure. In still other embodiments, a single party may perform all of the identification, determination, and manufacturing steps. In short, any number of entities may perform any number of tasks and sub-tasks that aid in the manufacture of a mode converting structure as described herein.

The distribution of dielectric constants may be a mathematically continuous distribution, may be mathematically/conceptually divided into a piecewise distribution (e.g., for optimization), and/or may be physically divided into a piecewise distribution (e.g., for manufacturing). That is, the mode converting structure may be divided (conceptually and/or actually) into a plurality of sub-wavelength voxels. Each voxel may have one or more dimensions with a maximum that is less than one half-wavelength in diameter for a specific frequency range. Each voxel may be assigned a dielectric constant based on the determined distribution of dielectric constants. Once manufactured, the mode converting structure may convert the EMR from a first mode to a second mode that approximates a target or goal field pattern.

Figure 11A:
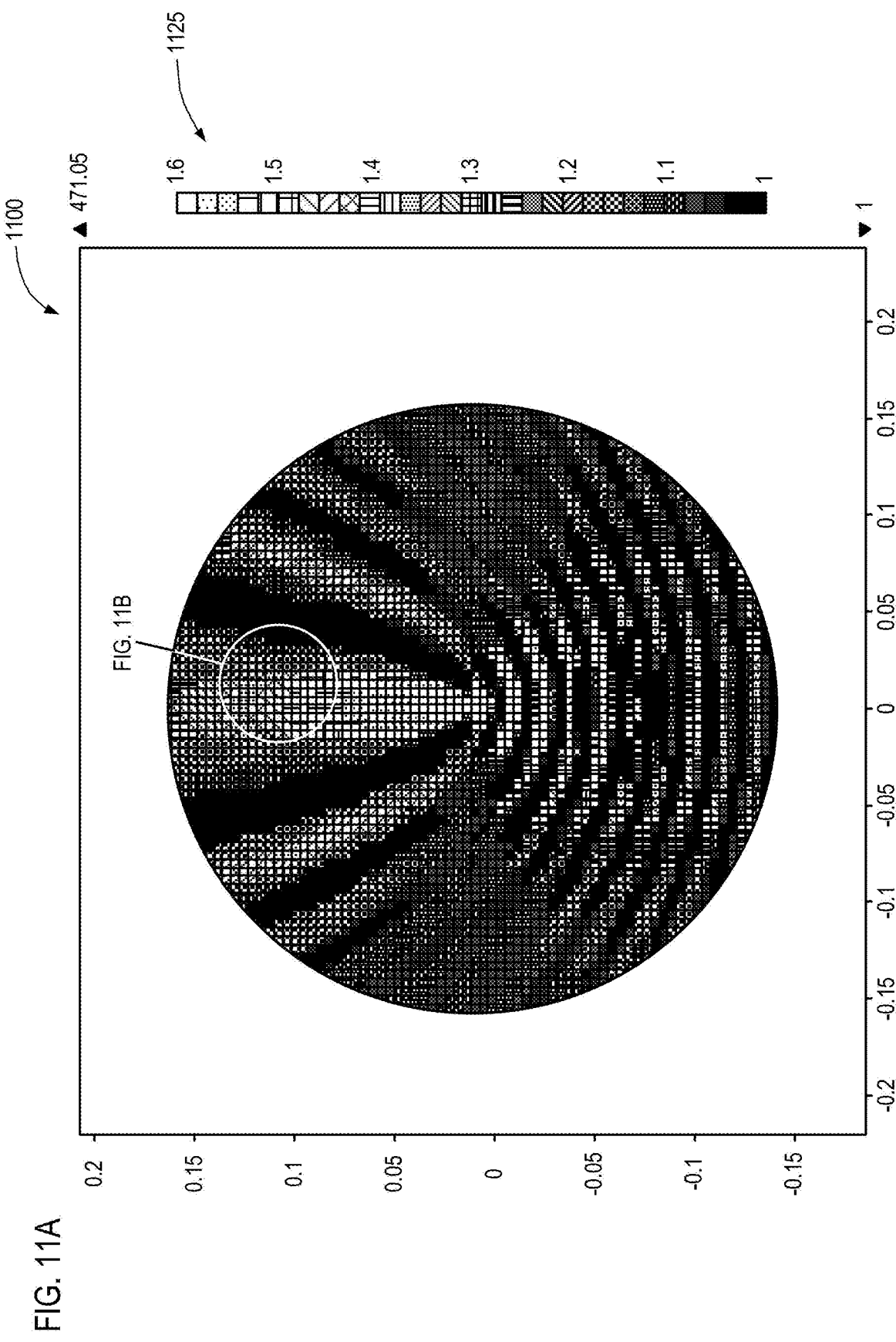
FIG. 11A illustrates a representation of discretization of the volumetric distribution of dielectric constants from FIG. 1A into a plurality of discrete dielectric constant values.

FIG. 11A illustrates a representation 1100 of the discretization of the volumetric distribution of dielectric constants from FIG. 1A into a plurality of discrete dielectric constant values. In the illustrated embodiment, the grayscale patterns in each of the boxes may each represent one of N discrete permittivity values, in which case the voxels are shown as relatively large for illustrative purposes. Alternatively, the grayscale patterns may represent a ratio of underlying binary permittivity values, in which case the individual boxes may represent averaged regions of tens, hundreds, or even thousands of underlying voxels.

That is, FIG. 11A may be thought of as representing the distribution of dielectric constants shown in FIG. 1A discretized into 29 unique permittivity values (see legend 1125) with a few hundred voxels in the entire image. Alternatively, legend 1125 may be thought of as representing 29 possible ratios of permittivity values in a binary discretization with a few hundred regions shown in the image, in which each region comprises a plurality of underlying voxels whose permittivity values have been averaged.

Figure 11B:
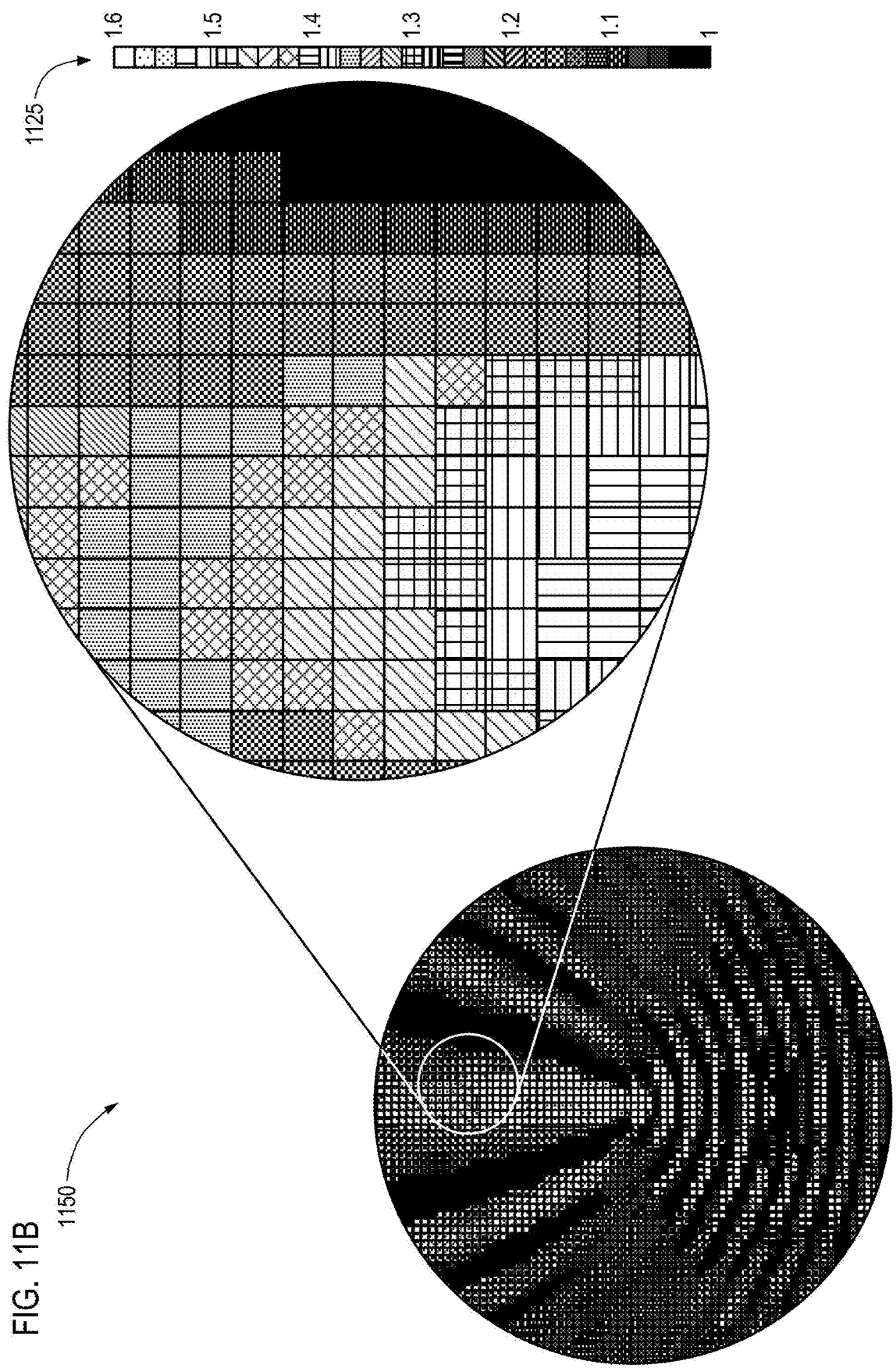
FIG. 11B illustrates a close up view of a portion of FIG. 11A.

FIG. 11B illustrates a close up view 1150 of the representation of individual discrete voxels of the distribution shown in FIG. 11A. Assuming a binary discretization, each square in FIG. 11B may represent an average of many underlying voxels.

Figure 11C:
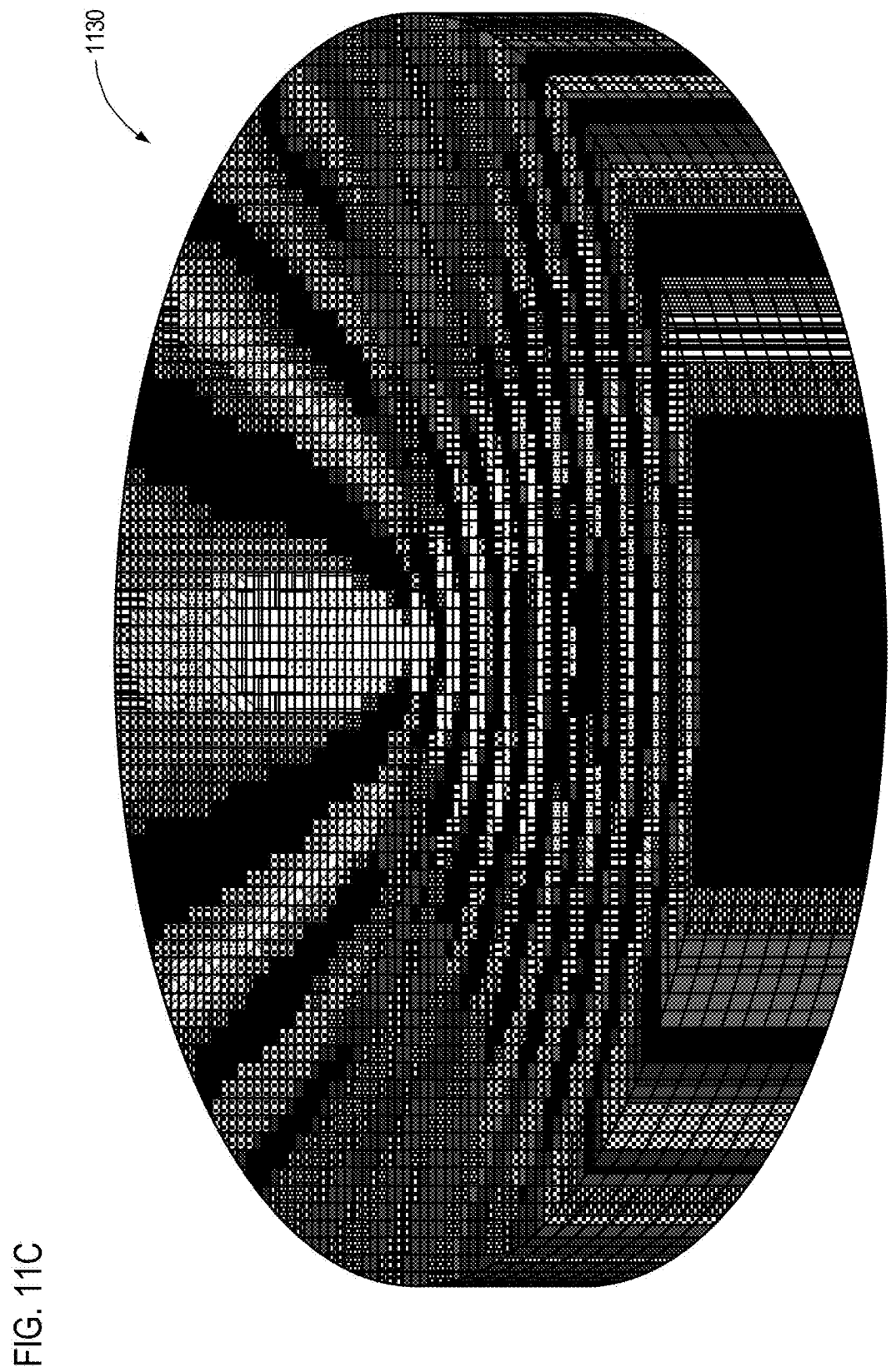
FIG. 11C illustrates a representation of a possible embodiment of a cylindrical mode converting structure with individual voxels assigned discrete dielectric constants.

FIG. 11C illustrates a representation of a possible embodiment of a cylindrical mode converting structure 1130 with individual voxels assigned discrete dielectric constants.

Figure 12:
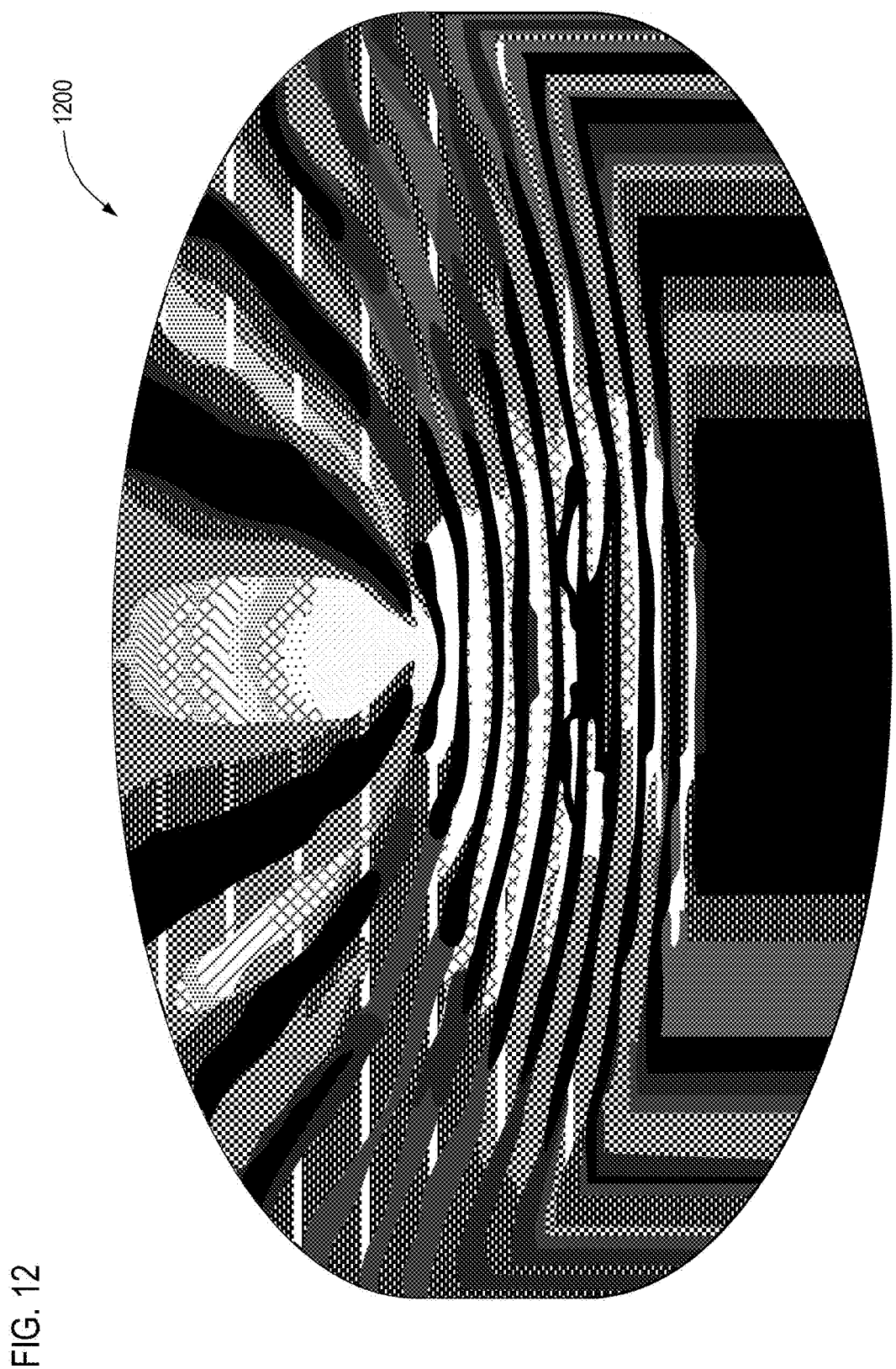
FIG. 12 illustrates a representation of the effective distribution of dielectric constants of the mode converting structure for voxels with sub-wavelength dimensions.

FIG. 12 illustrates a representation of the effective distribution of dielectric constants of the mode converting structure of FIG. 11C for voxels with sub-wavelength dimensions. As illustrated, if the feature sizes of each voxel are small enough, the discretized distribution of dielectric constants closely approximates and may, for purposes of a given bandwidth of an EMR device, be functionally equivalent to a continuous distribution of dielectric constants. However, for the implementation of optimization algorithms and/or to facilitate in the manufacturing process, it may be beneficial to discretize the distribution of dielectric constants to include N discrete values, where N is selected based on the manufacturing technique employed, the number of available dielectric materials, and/or the homogenous or heterogeneous nature of such dielectrics.

One method of generating the mode converting structure comprises using a three-dimensional printer to deposit one or more materials having unique dielectric constants. As described above, each voxel may be assigned a dielectric constant based on the calculated distribution of dielectric constants. The three-dimensional printer may be used to "fill" or "print" a voxel with a material corresponding to (perhaps equal to or approximating) the assigned dielectric constant.

Three-dimensional printing using multiple materials may allow for various dielectric constants to be printed. In other embodiments, spaces or voids may be formed in which no material is printed. The spaces or voids may be filled with a fluid or a vacuum, or ambient fluid(s) may enter the voids (e.g., air).

In some embodiments, a multi-material three-dimensional printer may be used to print each voxel using a mixture or combination of the multiple materials. The mixture or combination of multiple materials may be printed as a homogeneous or heterogeneous mixture. In embodiments in which a homogeneous mixture is printed, the printer resolution may be approximately equal to the voxel size. In embodiments in which a heterogeneous mixture is printed, the printer resolution may be much smaller than the voxel size and each voxel may be printed using a combination of materials whose average dielectric constant approximates the assigned dielectric constant for the particular voxel.

In some embodiments, the mode converting structure may be divided into a plurality of layers. Each of the layers may then be manufactured individually and then joined together to form the complete mode converting structure. Each layer may, in some embodiments, be formed by removing material from a plurality of voxels in a solid planar layer of material having a first dielectric constant.

The removed voxels may then be filled with material(s) having one or more different dielectric constants. In some embodiments, the mode converting structure may be rotationally symmetrical such that it can be manufactured by creating a first planar portion and rotating it about an axis.

As described above, a binary discretization may result in a plurality of voxels, each of which is assigned one of two possible permittivity values. The resolution and size of the voxels selected may be based on the wavelength size of the frequency range being used.

In some embodiments, one of the two discrete dielectric constants may be approximately 80. Another of the dielectric constants may be approximately equal to a dielectric constant of distilled water at a temperature between 0 and 100 degrees Celsius. In some embodiments, one of the two discrete dielectric constants and/or a third dielectric constant may be approximately 1, such as air. As may be appreciated, the usage of a finite number of materials having a finite number of unique dielectric constants and/or the usage of voxels having a non-zero size may result in a mode converting structure being fabricated that only approximates the calculated continuous distribution of dielectric constants.

Any of a wide variety of materials and methods of manufacturing may be employed. For example, a mode converting structure may be manufactured, at least in part, using glass-forming materials, polymers, metamaterials, aperiodic photonic crystals, silica, composite metamaterials, porous materials, foam materials, layered composite materials, stratified composite materials, fiber-bundle materials, micro-rod materials, nano-rod materials, a non-superluminal low loss dielectric material, porcelain, glass, plastic, air, nitrogen, sulfur hexafluoride, parylene, mineral oil, ceramic, paper, mica, polyethylene, and aluminum oxide.

The mode converting structure may be fabricated by heating a material above a glass transition temperature and extruding a molten form of the material through a mask. The mask may be a rigid mask. Any other fabrication method or combination of fabrication techniques may be used, including injection molding, chemical etching, chemical deposition, heating, ultrasonication, and/or other fabrication techniques known in the art.

An NSLLD material may have a phase velocity for electromagnetic waves at a relevant frequency range that is less than c, where c is the speed of light in a vacuum. Metamaterials may be used as effective media with dielectric constants less than 1 for a finite frequency range, and more than one type or configuration of metamaterial may be used that has unique dielectric constants. Various metamaterials may be used that have complex permittivity values. The complex permittivity values may function as an effective-gain medium for a relevant frequency range and/or may correspond to a negative imaginary part of the effective dielectric constant for the relevant frequency range.

The mode converting structure may be manufactured to have a width and/or length similar to or corresponding to that of the EMR device. In various embodiments, the mode converting structure may have a thickness that is less than one wavelength or a fraction of a wavelength of a frequency within a relevant frequency range for a particular EMR device. In other embodiments, the mode converting structure may have a thickness equivalent to several or even tens of wavelengths. The thickness of the mode converting structure may be uniform or non-uniform and may be substantially flat, rectangular, square, spherical, disc-shaped, parabolic in shape, and other have another shape or profile for a particular application or to correspond to a particular EMR device.

In some embodiments, the mode converting structure may be configured to function as one of: an E-type T junction, an H-type T junction, a magic T hybrid junction, and a hybrid ring junction.

As previously described, the mode converting structure may be manufactured to have a distribution of dielectric constants, or an approximation thereof, that will cause a mode conversion of EMR output by the EMR device from a first mode to a second mode through which a target radiation pattern or "goal" may be attained. The target radiation pattern may, for example, be similar to that of an ideal half-wave dipole antenna with a directivity between approximately 2 and 5 dBi, that of an ideal horn antenna with a directivity of between approximately 10 and 20 dBi, or that of an ideal dish antenna with a directivity greater than 10 dBi.

As per the examples above, the mode converting structure may be configured to narrow the far-field beamwidth of the main lobe of the EMR device. In some embodiments, the distribution of dielectric constants may be calculated to create at least one deep minimum or null in a far-field directivity pattern.

In most embodiments, the mode converting structure may be configured to increase the directional gain of the EMR device. In some embodiments, the mode converting structure may be configured to perform one or more functions, including: decrease maximum sidelobe lever; decrease far-field sidelobes; decrease directivity in one or more directions; decrease the power of at least one sidelobe; decrease the power radiated into a specific solid angle; change the direction of a strongest sidelobe; change the direction of a sidelobe closest to a boresight; decrease radiation in an approximately opposite direction of a main lobe direction; decrease radiation in a backward half space defined as the direction between approximately 180 and 270 degrees relative to the boresight; decrease radiation with a selected polarization; change a polarization of at least some of the radiated EMR from a first polarization to a second polarization; increase the uniformity of the radiation profile of the EMR device in the near-field; create a null of electric field in the near-field of the EMR device; create a null of magnetic field in the near-field of the EMR device; create a concentration of electromagnetic energy density of electric field in the near-field of the EMR device; create a concentration of energy density of magnetic field in the near-field of the EMR device; reduce peak values of electric field in the near-field of the EMR device; and/or reduce peak values of magnetic field in the near-field of the EMR device.

In some embodiments, the mode converting structure may be configured with a distribution of dielectric constants to modify the far-field radiation pattern to compensate for a re-radiating object in the near- or far-field of the EMR device. For example, support structures, interfering objects, structures, vehicles, other antennas, and/or metallic objects may be in the near-field of an antenna system and impact the far-field radiation pattern. Accordingly, a mode converting structure may be adapted to specifically modify the far-field pattern to make it as if the object(s) in the near-field were substantially absent.

In various embodiments, a mode converting structure may include a distribution of discretized dielectric constants configured for use with a planar antenna. The planar antenna may be housed within a radome and/or a protective casing. The mode converting structure may be part of the radome and/or the protective casing, or applied to the radome and/or the protective casing after installation. The mode converting structure may modify the far-field and/or near-field radiation pattern of the planar antenna and/or compensate for any re-radiating objects in near-field of the planar antenna.

In other embodiments, a mode converting structure may be formed as part of a radome for a horn antenna. The radome may include additional components or features to secure the mode converting structure to a support of the horn antenna. In still other embodiments, a mode converting structure may be formed as part of a protective cover for a dipole antenna.

In each of FIGS. 13-17D, the illustrated grayscale shading of the mode converting structures 1375, 1475, 1575, 1700, 1710, 1720, and 1730 is for illustrative purposes only and does not correspond to a useful distribution of dielectric constants and is not intended to represent an actual or even plausible distribution of dielectric constants. Actual dimensions and distributions of dielectric constants can be calculated and/or optimized using the various algorithms, methods, and approaches described herein. Moreover, while the illustrated embodiments show and describe various applications of the above-described systems and methods using waveguides as examples, it is appreciated that the various systems and methods described herein are applicable to a wide variety of transmission lines and not just waveguides.

Figure 13:
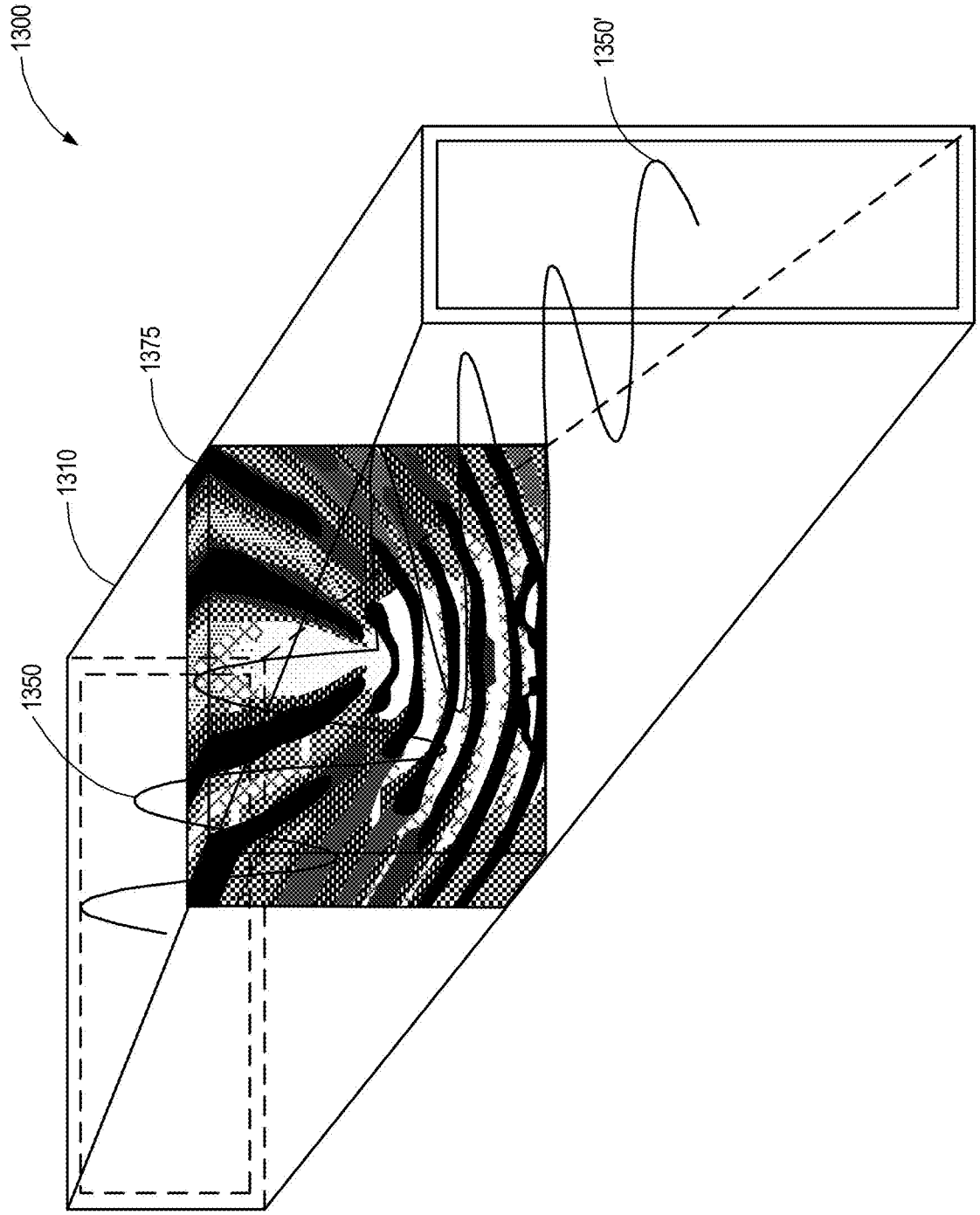
FIG. 13 illustrates one embodiment of a mode converting structure within a first waveguide configured to convert electromagnetic energy from a first mode to a second mode.

FIG. 13 illustrates one embodiment 1300 of a mode converting structure 1375 within a first waveguide 1310 configured to convert EMR from a first mode 1350 to an EMR with a second mode 1350'. The mode converting structure 1375 may be said to couple a first waveguide with EMR in the first mode 1350 and a second waveguide with EMR in the second mode 1350'. Alternatively, the mode converting structure 1375 may be described as an insert or component within a single waveguide. As illustrated, the first portion of the waveguide (or first waveguide) with the EMR in the first mode 1350 may have different dimensions than the second portion of the waveguide (or second waveguide) with the EMR in the second mode 1350'.

Figure 14A:
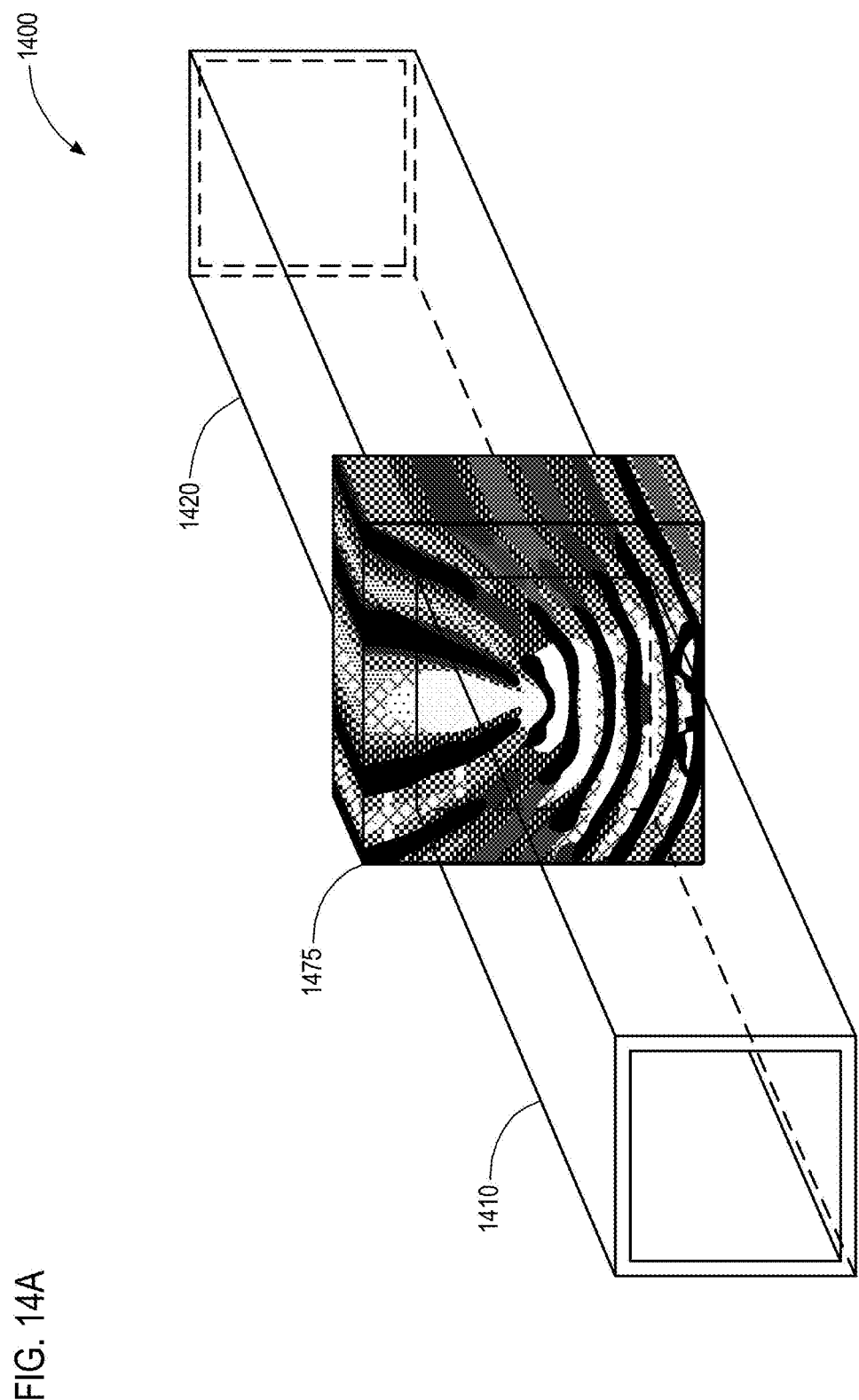
FIG. 14A illustrates an embodiment of a mode converting structure positioned between a first waveguide and a second waveguide.

FIG. 14A illustrates an embodiment 1400 of a mode converting structure 1475 positioned between a first waveguide 1410 and a second waveguide 1420. As illustrated, the mode converting structure 1475 may have dimensions in one or more directions that exceed that of one or both waveguides 1410 and 1420. In various embodiments, the mode converting structure 1475 may mechanically, magnetically, and/or otherwise couple the first waveguide to the second waveguide. In some embodiments, the mode converting structure 1475 may be inserted into a waveguide couple configured to couple two waveguides together. In still other embodiments, the mode converting structure 1475 may be inserted within a coupling device configured to join multiple sections of a waveguide together.

Figure 14B:
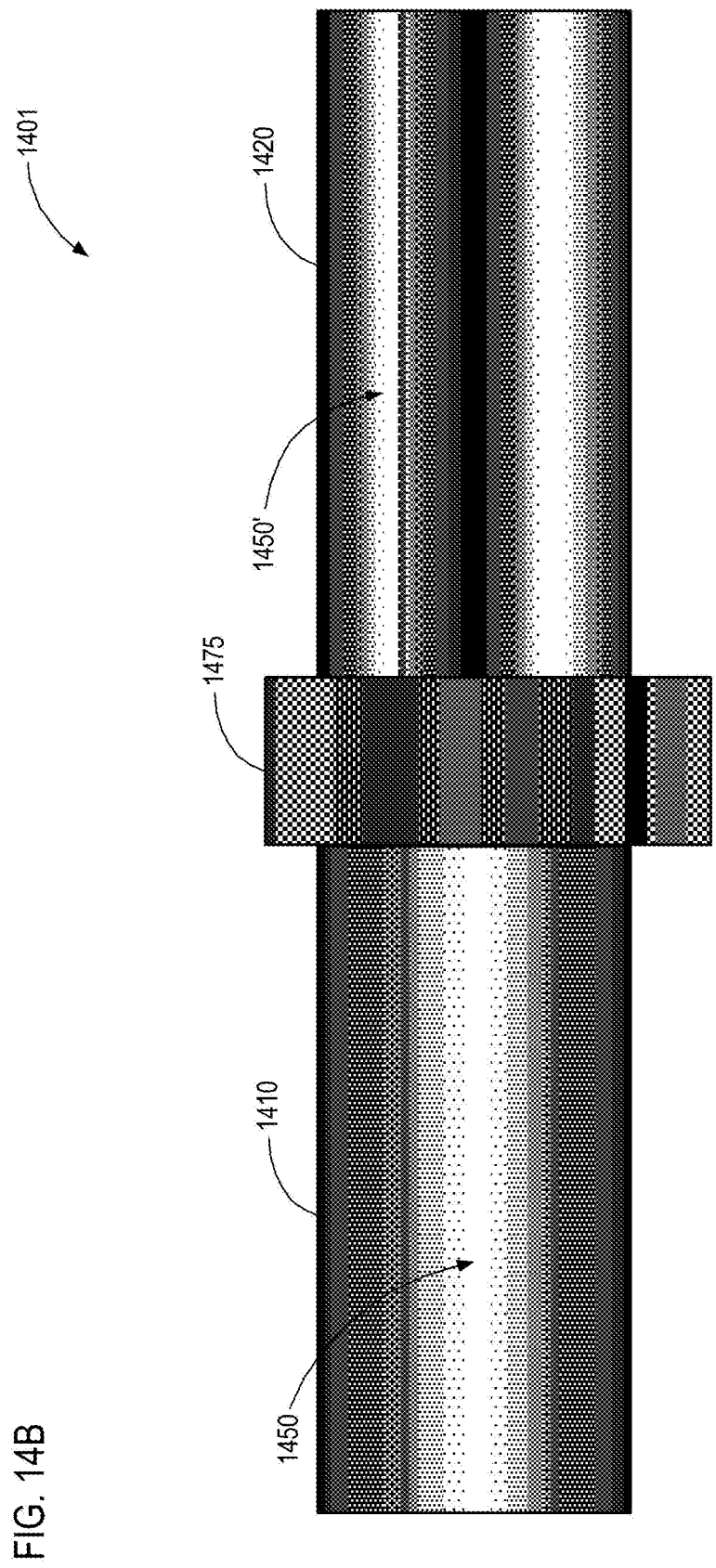
FIG. 14B illustrates a simulated embodiment of electromagnetic energy with the first waveguide in a first mode converted by the mode converting structure into a second mode within the second waveguide.

FIG. 14B illustrates a simulated embodiment 1401 of EMR in a first mode 1450 with the peak electric field concentrated near the perimeter (darker shading). A mode converting structure 1475 converts the EMR from the first mode 1450 with a peak electric field concentrated near the perimeter of the first waveguide 1410 to EMR in a second mode 1450' with the peak electric field concentrated near the center of the second waveguide 1420 (again, darker shading).

Figure 15A:
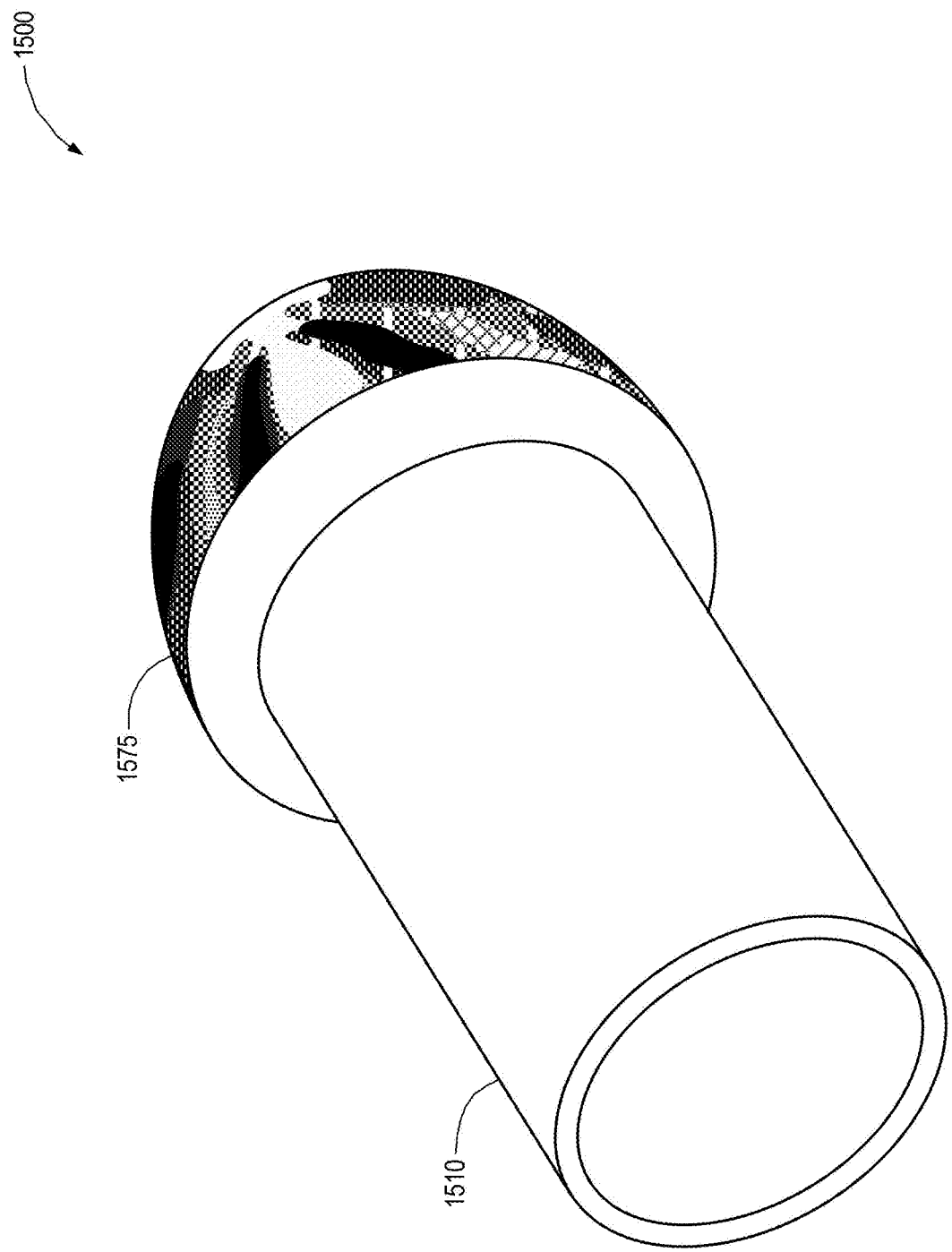
FIG. 15A illustrates an embodiment of a mode converting structure positioned on the end of a first waveguide to convert electromagnetic radiation from a first mode within the waveguide to a second mode for free-space transmission.

FIG. 15A illustrates an embodiment 1500 of a mode converting structure 1575 positioned on the end of a first waveguide 1510 to convert EMR from a first mode within the waveguide 1510 to a second mode for free-space transmission.

Figure 15B:
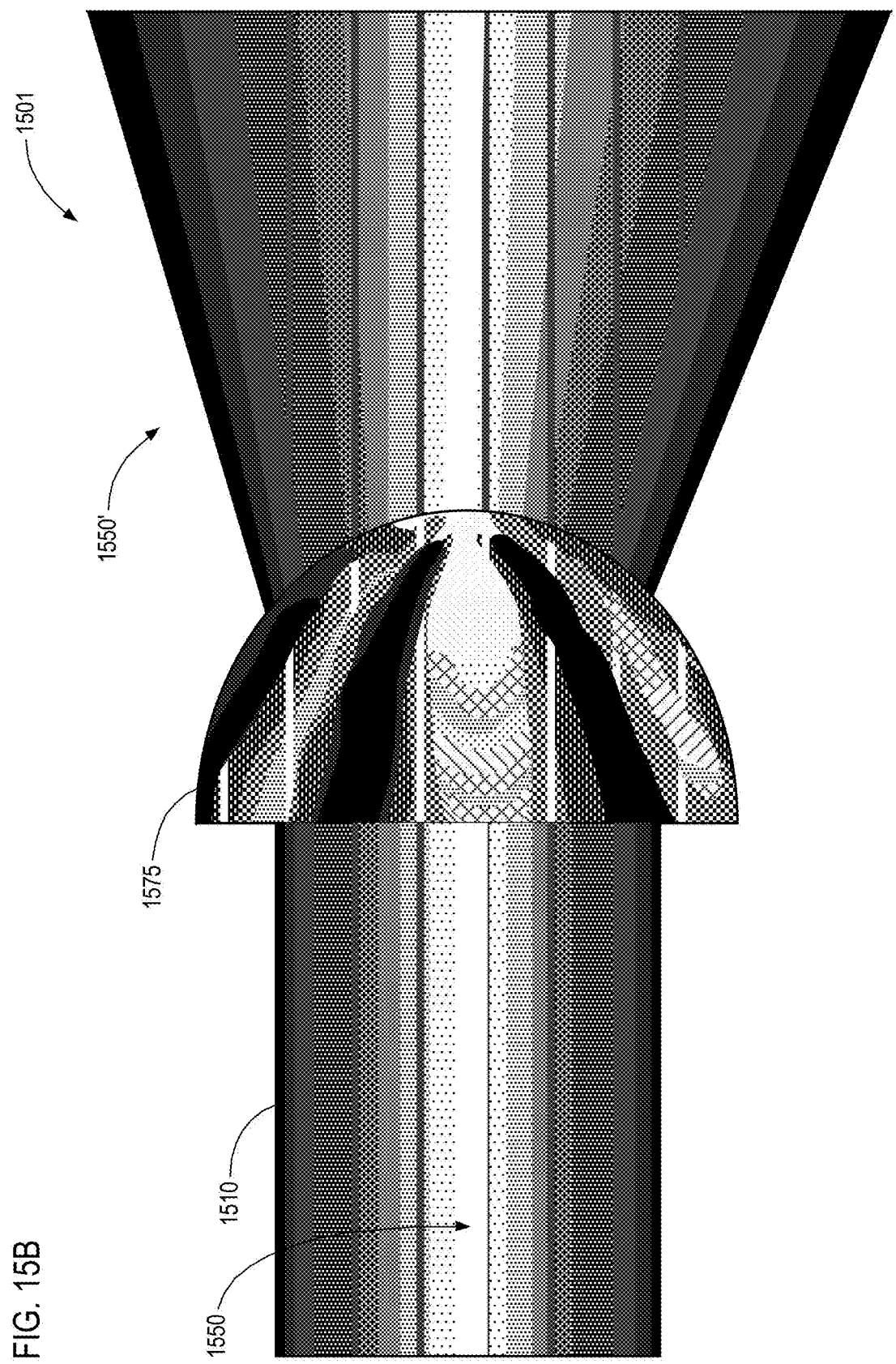
FIG. 15B illustrates a simulated embodiment of electromagnetic energy within the first waveguide in a first mode converted by the mode converting structure into a second mode for free-space transmission.

FIG. 15B illustrates a simulated embodiment 1501 of EMR within a first waveguide 1510 in a first mode 1550 converted by a mode converting structure 1575 into a second mode 1550' for free-space transmission. The mode converting structure 1575 may be adapted to focus or, alternatively, disperse the EMR for free-space transmission. In some embodiments, the mode converting structure 1575 may be adapted to transfer a signal to another waveguide over a short free-space gap. In other embodiments, the mode converting structure 1575 may be used to transmit EMR in the second mode 1550' via free space to a receiving antenna.

Figure 16B:
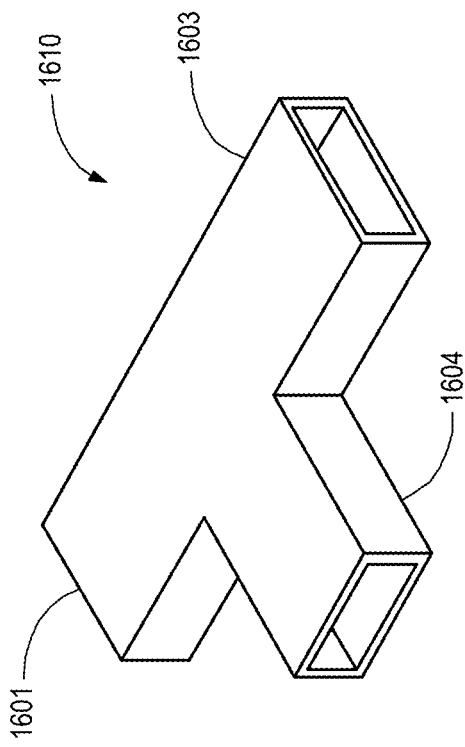
FIGS. 16A-D illustrate various embodiments of waveguide junctions.
Figure 16D:
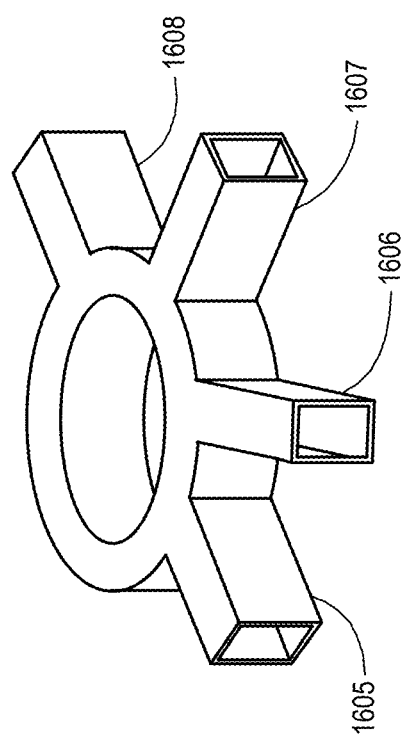
Figure 16A:
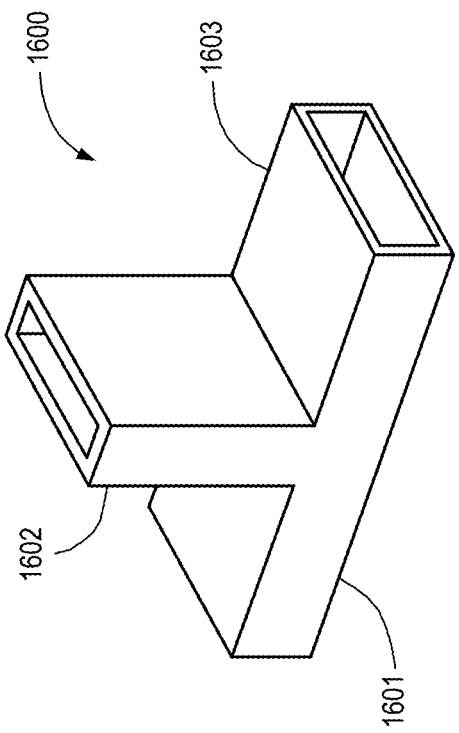

FIG. 16A illustrates an E-type T junction 1600 with the top of the "T" 1602 extending from the main waveguide (1601 through to 1603) in the same direction as the electric field. In various embodiments, the output waveguide 1603 is 180° out of phase with respect to the input waveguide 1601.

FIG. 16B illustrates an H-type T junction 1610 with the long axis of the waveguide (extending from 1601 to 1603) is parallel to the plane of the magnetic lines of force within the waveguide. In some embodiments, the H-type T junction may be used to connect waveguides while preserving phase regardless of which ports 1601, 1603, and 1604 are used.

Figure 16C:
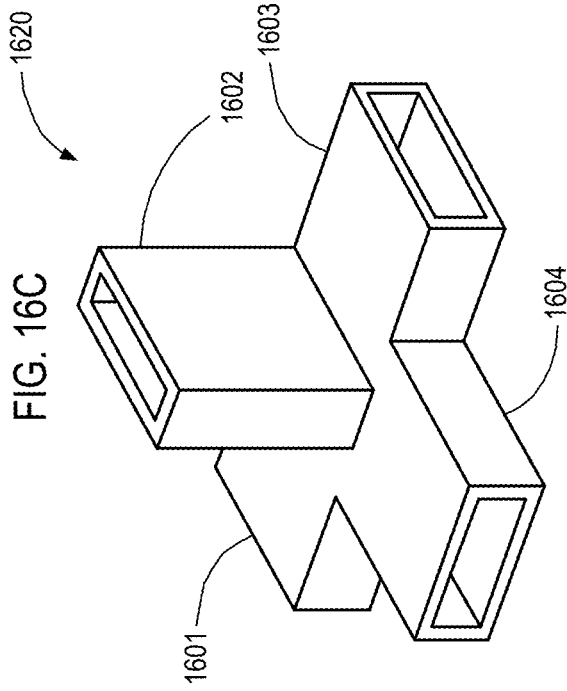

FIG. 16C illustrates a Magic T hybrid waveguide junction 1620 combining an H-type and E-type T junction. When a signal is applied to port 1604, no signal appears at port 1602 and the two signals appearing at ports 1601 and 1603 are 180° out of phase with respect to each other. When a signal is input via port 1601, a signal appears at ports 1602 and 1604, but not at port 1603. When a signal is input via port 1603, a signal appears at ports 1602 and 1604, but not at port 1601.

FIG. 16D illustrates a hybrid ring waveguide junction 1630. In some embodiments, port 1605 may be connected to an antenna, port 1606 may be connected to a receiver, port 1607 may be connected to a transmitter, and port 1608 may be connected to a receiver. The hybrid ring waveguide junction 1630 may function as a duplexer.

During a transmit period/cycle, the hybrid ring waveguide junction 1630 may couple the transmitter port 1607 to the antenna port 1605 without energy being conveyed to the receiver ports 1606 and 1608. During the receive period/cycle, the hybrid ring waveguide junction 1630 may couple energy from the antenna port 1605 to the receiver 1606 and/or 1608 without energy being conveyed to the transmitter port 1607.

Figure 17A:
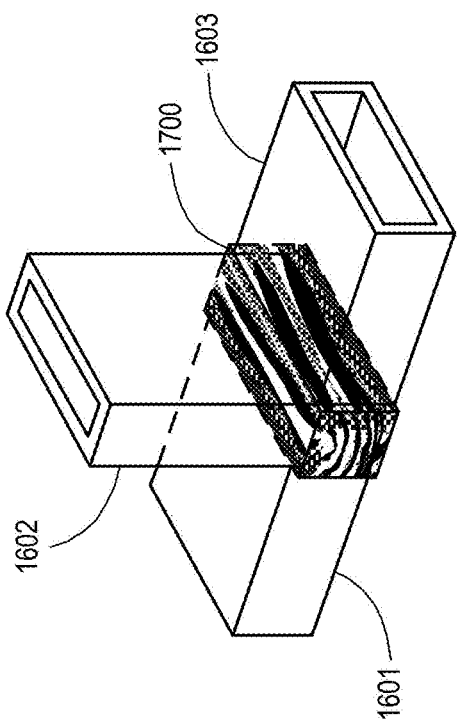
FIGS. 17A-D illustrate embodiments of waveguides joined using mode converting structures to approximate and/or improve the functionality of the waveguides of FIGS. 16A-D.

FIG. 17A illustrates a mode converting structure 1700 configured with up to three ports 1601, 1602, and 1603 for connecting up to three waveguides. The mode converting structure 1700 may be configured with a distribution of dielectric constants configured to function similar to an E-type T junction, even if one or more ports is not actually present. For example, mode converting structure 1700 may connect waveguides via ports 1601 and 1603 180° out of phase without any waveguide connected to port 1602 or even without port 1602.

Figure 17B:
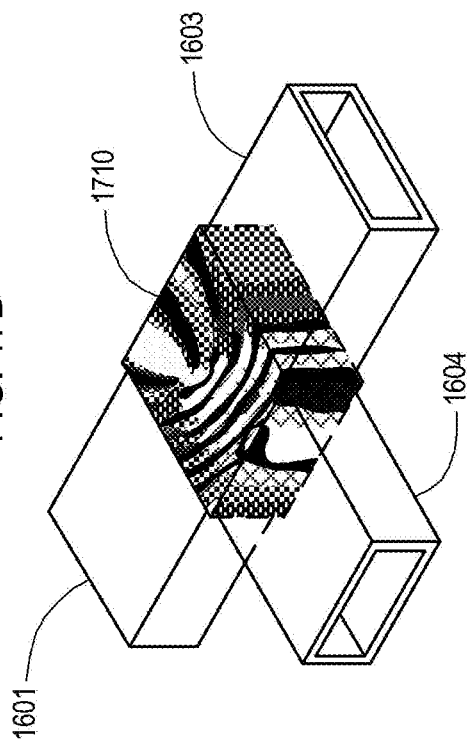

FIG. 17B illustrates a mode converting structure 1710 configured with up to three ports 1601, 1602, and 1603 for connecting up to three waveguides. The mode converting structure 1710 may be configured with a distribution of dielectric constants configured to function similar to an H-type T junction, even if one or more ports is not actually present. For example, mode converting structure 1710 may connect waveguides via any two or three of ports 1601, 1603, and 1604.

Figure 17C:
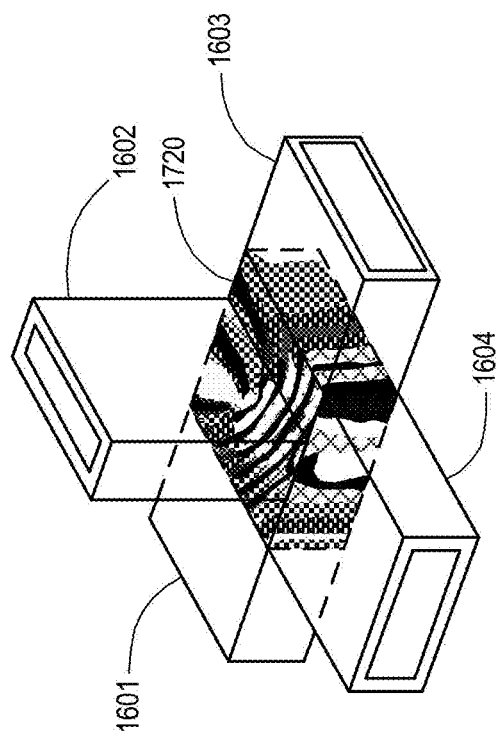

FIG. 17C illustrates a mode converting structure 1720 configured with up to four ports 1601, 1602, 1603, and 1604 for connecting up to four waveguides. The mode converting structure 1720 may be configured with a distribution of dielectric constants configured to function similar to a Magic T hybrid waveguide junction, even if one or more ports is not actually present and/or not connected to a waveguide.

For example, regardless of which ports are present and/or how many ports are actually connected to mode converting structure 1720: (1) when a signal is applied to port 1604, the signals may appear at ports 1601 and 1603 that are 180° out of phase with respect to each other; (2) when a signal is input via port 1601, a signal may appear at ports 1602 and 1604; and (3) when a signal is input via port 1603, a signal appears at ports 1602 and 1604.

Figure 17D:
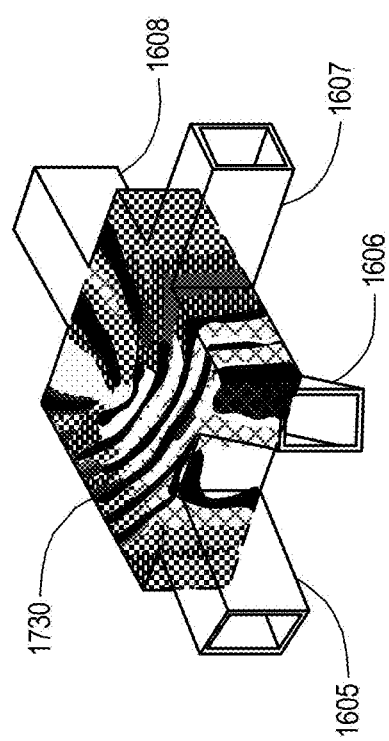

FIG. 17D illustrates a mode converting structure 1730 configured with up to four ports 1605, 1606, 1607, and 1608 for connecting up to four waveguides. The mode converting structure 1730 may be configured with a distribution of dielectric constants configured to function similar to a hybrid ring waveguide junction as described in FIG. 16D, even if one or more ports is not actually present and/or not connected to a waveguide.

Figure 18A:
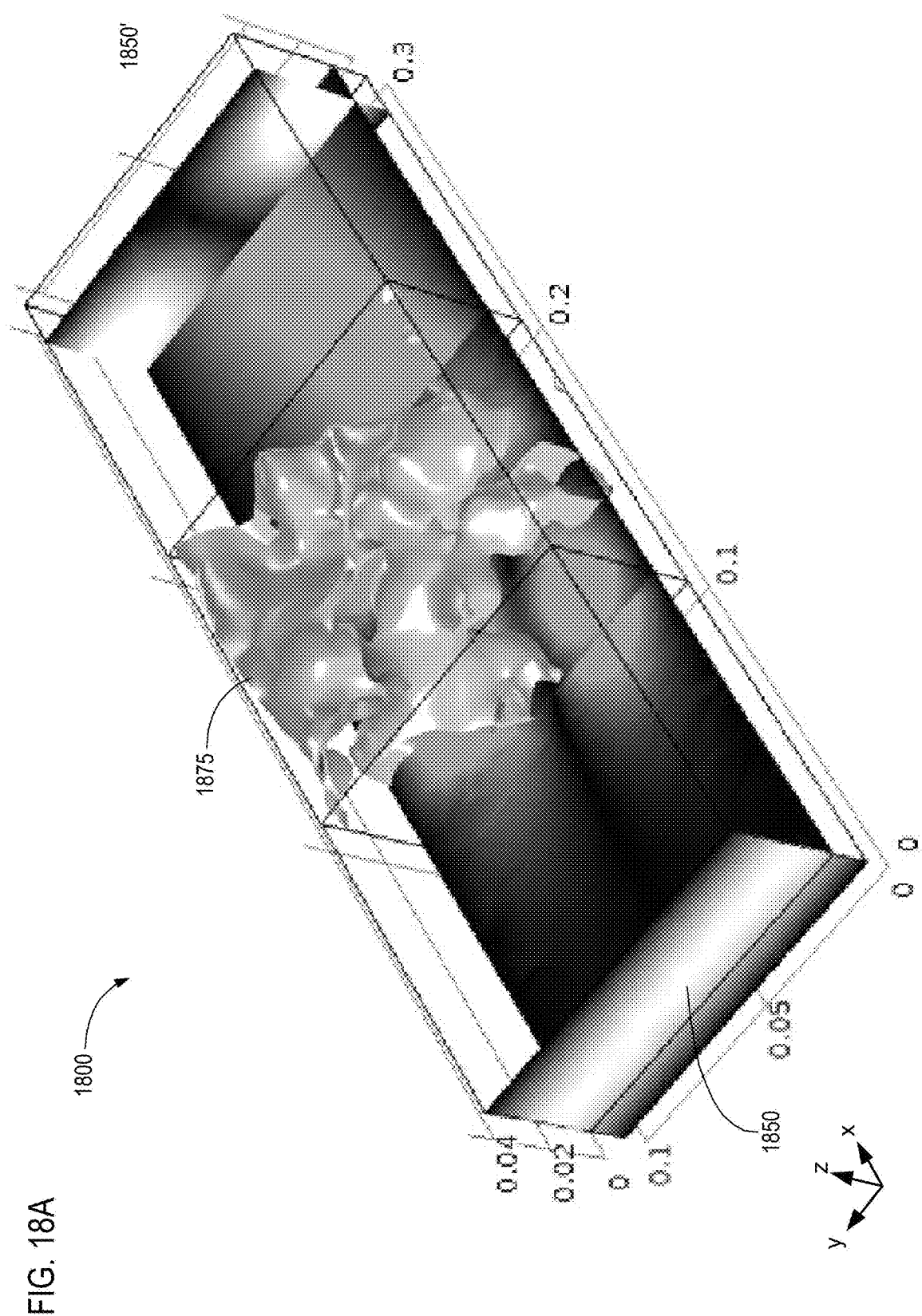
FIG. 18A illustrates one embodiment of a mode converting structure positioned inside of a waveguide to convert electromagnetic energy from a $TE_{01}$ mode, to a $TM_{11}$ mode.

FIG. 18A illustrates a mode converting structure 1875 positioned inside of a waveguide 1800. The mode converting structure 1875 may be configured with a distribution of dielectric constants configured to convert EMR from one mode to another. For example, the mode converting structure may convert EMR from a first mode 1850 to a second mode 1850'.

As a specific example, the first mode 1850 may comprise EMR in a $TE_{01}$ mode, where the electric field is transverse to the direction of propagation. In the $TE_{01}$ mode 1850 the wide dimension of the waveguide 1800 is one half of the wavelength of the electric field and the narrow dimension is less than one half of the wavelength of the magnetic field. The second mode 1850' may be EMR in a $TM_{11}$ mode, where the magnetic field is transverse to the direction of the direction of propagation. In the second mode 1850', the wide direction of the waveguide is equal to half the wavelength of the magnetic field and the narrow direction of the waveguide is equal to half the wavelength of the electric field.

In the illustrated embodiments, the mode converting structure 1875 changes the mode of the EMR from first mode to a second mode. In some embodiments, the mode converting structure 875 may the mode of the EMR and modify one or more properties of the EMR such as, but not limited to, the wavelength, polarization, frequency, amplitude, phase, and/or focus).

In an alternative embodiment, the mode converting structure 1875 may be juxtapositioned between two different waveguides to the left and right of the mode converting structure 1875, as opposed to being an insert within a single, continuous waveguide.

Additionally, in some embodiments the waveguide portion (or distinct waveguide) to the left of the mode converting structure 1875 may be a different dimension than the waveguide portion (or distinct waveguide) to the right of the mode converting structure 1875. Similarly, the waveguide or waveguide portion housing the mode converting structure 1875 may have a different dimension than either of the other waveguides or waveguide portions.

Figure 18B:
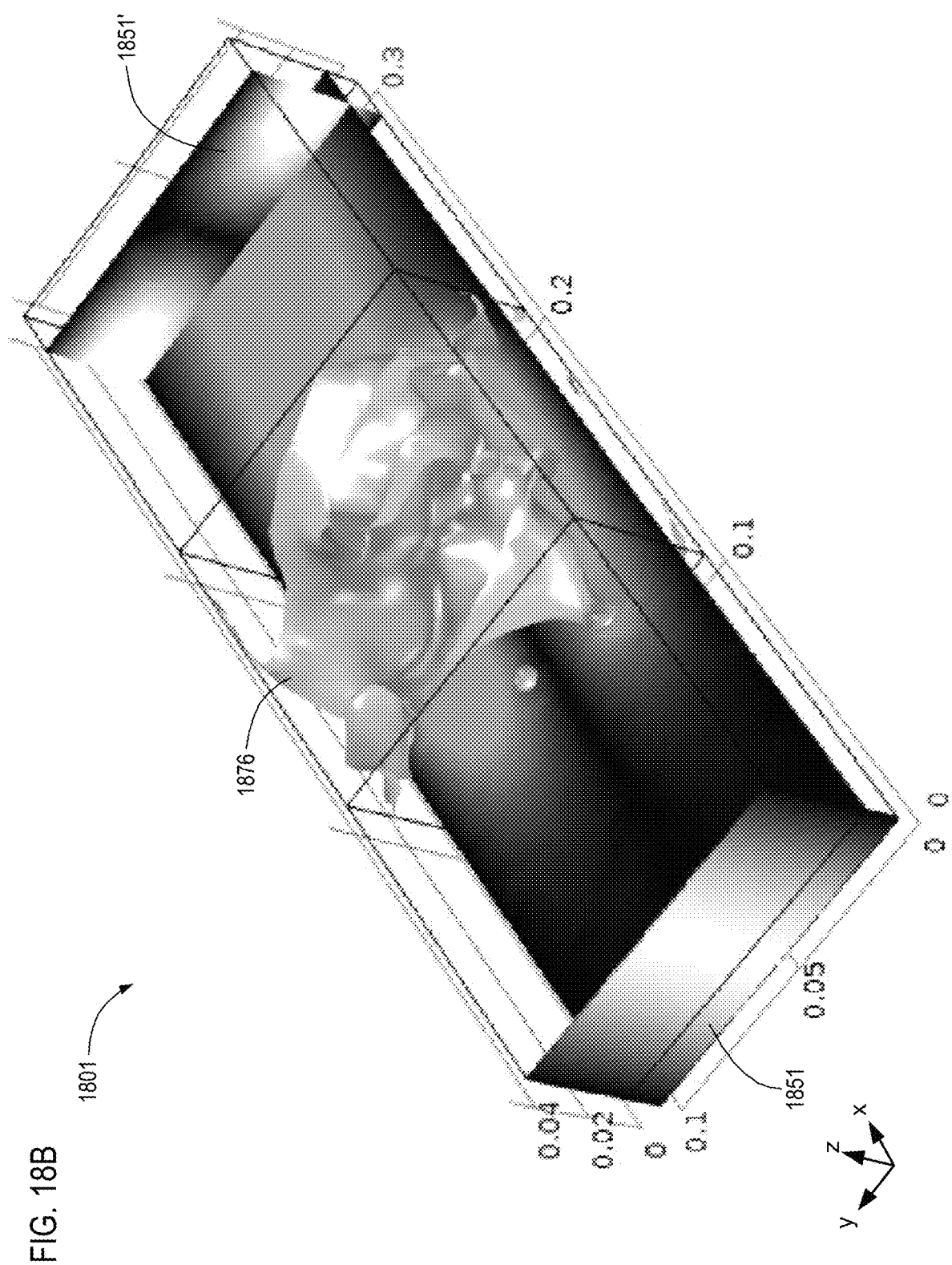
FIG. 18B illustrates one embodiment of a mode converting structure positioned inside of a waveguide to convert electromagnetic energy from a $TE_{10}$ mode, to a $TM_{11}$ mode.

FIG. 18B illustrates a waveguide 1801 containing a mode converting structure 1876. The mode converting structure 1876 may be configured with a distribution of dielectric constants configured to convert EMR from a first mode 1851 to a second mode 1851'. The first mode may be $TE_{10}$ and the second mode may be $TM_{11}$. The mode converting structure 1876 may be configured to convert EMR in a $TE_{x,y}$ mode into EMR in a $TM_{m,n}$ mode, where m, n, x, and y are non-negative integers.

Figure 18C:
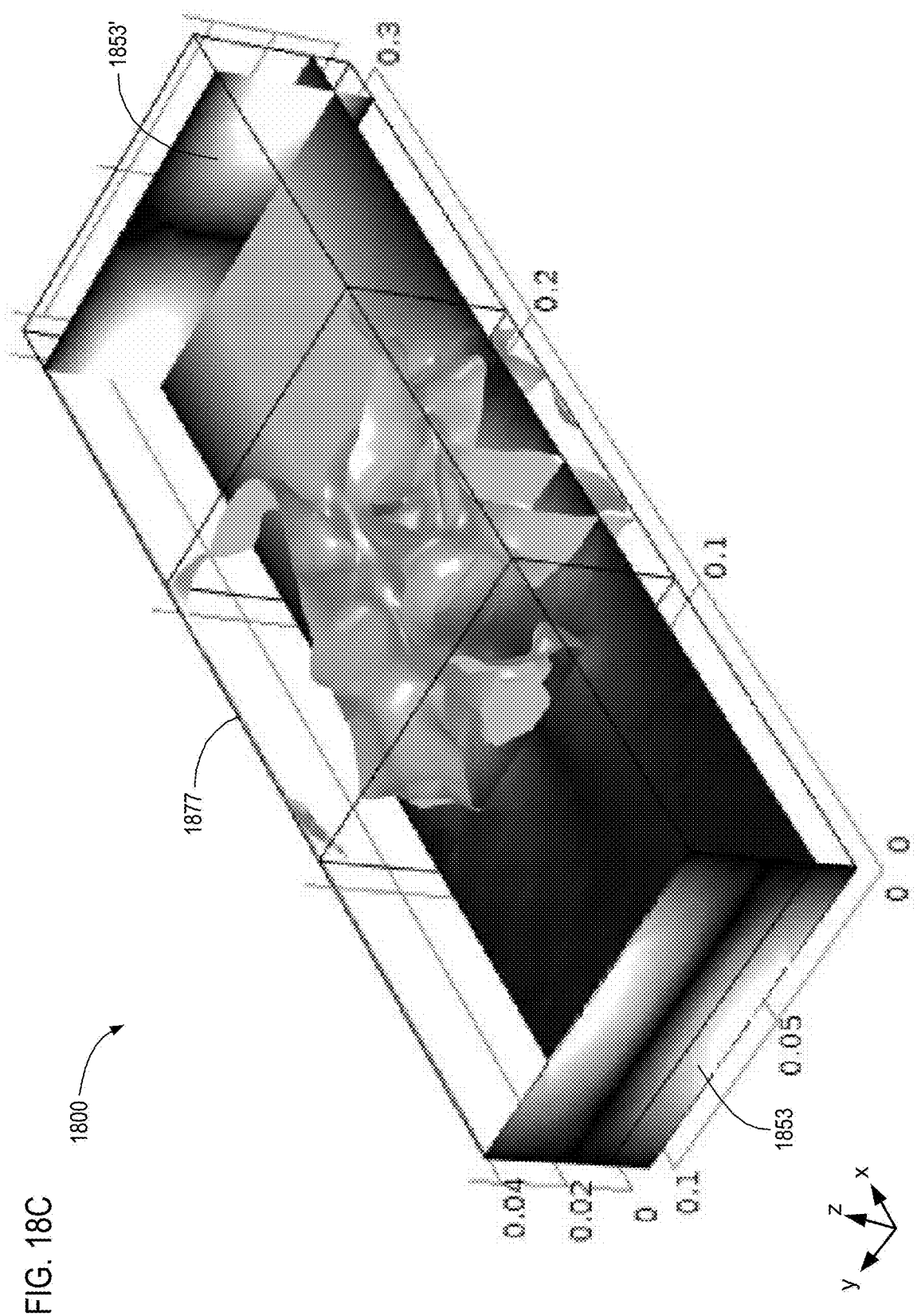
FIG. 18C illustrates one embodiment of a mode converting structure positioned inside of a waveguide to convert electromagnetic energy from a $TE_{11}$ mode, to a $TM_{11}$ mode.

FIG. 18C illustrates a waveguide 1802 containing a mode converting structure 1877. The mode converting structure 1877 may be configured with a distribution of dielectric constants configured to convert EMR from a first mode 1853 to a second mode 1853'. The first mode may be, as a specific example, $TE_{11}$ and the second mode may be $TM_{11}$. Similar to FIG. 18A, the mode of the EMR may be changed from transverse electric to transverse magnetic, or vice versa.

Many existing computing devices and infrastructures may be used in combination with the presently described systems and methods. Some of the infrastructure that can be used with embodiments disclosed herein is already available, such as general-purpose computers, computer programming tools and techniques, digital storage media, and communication links. A computing device or controller may include a processor, such as a microprocessor, a microcontroller, logic circuitry, or the like. A processor may include a special purpose processing device, such as application-specific integrated circuits (ASIC), programmable array logic (PAL), programmable logic array (PLA), programmable logic device (PLD), field programmable gate array (FPGA), or other customizable and/or programmable device. The computing device may also include a machine-readable storage device, such as non-volatile memory, static RAM, dynamic RAM, ROM, CD-ROM, disk, tape, magnetic, optical, flash memory, or other machine-readable storage medium. Various aspects of certain embodiments may be implemented using hardware, software, firmware, or a combination thereof.

The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In many instances, well-known structures, materials, or operations are not shown or described in detail to avoid obscuring aspects of this disclosure.

The embodiments of the systems and methods provided within this disclosure are not intended to limit the scope of the disclosure, but are merely representative of possible embodiments. In addition, the steps of a method do not necessarily need to be executed in any specific order, or even sequentially, nor do the steps need to be executed only once. As described above, descriptions and variations described in terms of transmitters are equally applicable to receivers, and vice versa.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

What is claimed is:

1. A method comprising:
   identifying a target field pattern for an electromagnetic radiation (EMR) device;
   identifying boundaries of a three-dimensional volume to enclose a mode converting structure relative to the EMR device;
   identifying an input field distribution of electromagnetic radiation on a surface of the mode converting structure from the EMR device;
   identifying a volumetric distribution of dielectric constants within the mode converting structure that will transform the input field distribution of electromagnetic radiation in a first mode to an output field distribution of electromagnetic radiation in a second mode that approximates the target field pattern, wherein the volumetric distribution of dielectric constants is selected using an optimization algorithm in which real and imaginary parts of dielectric constants in the volumetric distribution of dielectric constants are treated as individually optimizable variables; and
   transmitting the volumetric distribution of dielectric constants for the generation of the mode converting structure.

2. The method of claim 1, further comprising generating the mode converting structure having the determined volumetric distribution of dielectric constants.

3. The method of claim 1, wherein the EMR device comprises a radio frequency (RF) antenna system.

4. The method of claim 1, wherein the volumetric distribution is approximately homogeneous in one spatial dimension in a coordinate system, such that the volumetric distribution of the mode converting structure is effectively two-dimensional.

5. The method of claim 1, wherein the volumetric distribution of dielectric constants is selected based on an equation for a holographic solution.

6. The method of claim 1, wherein the optimization algorithm includes starting with an initial guess corresponding to a holographic solution.

7. The method of claim 1, wherein the volume of the mode converting structure is divided into a plurality of sub-wavelength voxels, wherein each voxel has a maximum dimension that is less than one half-wavelength in diameter for a finite frequency range, and wherein each voxel is assigned a dielectric constant based on the determined volumetric distribution of dielectric constants for approximating the target field pattern.

8. The method of claim 7, further comprising generating the mode converting structure with the voxels having the determined volumetric distribution of dielectric constants.

9. The method of claim 8, wherein generating the mode converting structure comprises using a three-dimensional (3D) printer to deposit a first material having a first dielectric constant in at least some of the plurality of voxels based on the determined volumetric distribution of dielectric constants.

10. The method of claim 9, wherein generating the mode converting structure further comprises using the three-dimensional (3D) printer to deposit a second material having a second dielectric constant that is different from the first dielectric constant in at least some of the plurality of voxels.

11. The method of claim 10, wherein generating the mode converting structure further comprises leaving at least some of the voxels without any of the first and second materials.

12. The method of claim 9, wherein generating the mode converting structure further comprises using the three-dimensional (3D) printer to deposit a combination of the first material and a second material having a second dielectric constant that is different from the first dielectric constant in at least some of the plurality of voxels, wherein the amount of the first material relative to the second material is varied in at least some of the voxels to attain a plurality of dielectric constants between the first dielectric constant and the second dielectric constant.

13. The method of claim 9, wherein generating the mode converting structure further comprises using a three-dimensional (3D) printer to deposit a combination of the first material and a second material in at least some of the plurality of voxels.

14. The method of claim 9, wherein generating the mode converting structure comprises:
conceptually dividing the mode converting structure into a plurality of layers;
manufacturing each of the plurality of layers individually; and
joining each of the plurality of layers to form the mode converting structure.

15. The method of claim 7, wherein each voxel is assigned a dielectric constant based on the determined volumetric distribution of dielectric constants using the optimization algorithm.

16. The method of claim 15, wherein the optimization algorithm includes modifying at least one optimizable variable and determining a cost function for the modification.

17. The method of claim 16, wherein the optimization algorithm includes determining a gradient of the cost function based on partial derivatives with respect to each of the optimizable variables.

18. The method of claim 15, wherein the optimization algorithm includes determining a sensitivity vector using an adjoint sensitivity algorithm.

19. The method of claim 1, wherein the distribution of dielectric constants is non-uniform.

20. The method of claim 1, wherein the mode converting structure is fabricated by heating a material above a glass transition temperature and extruding a molten form of the material through a mask.

21. The method of claim 1, wherein the mode converting structure is fabricated using injection molding of a forming material, wherein a mold material is removed after the solidification of the forming material.

22. The method of claim 1, wherein the mode converting structure comprises a metamaterial.

23. The method of claim 1, wherein the mode converting structure comprises a metamaterial with an effective dielectric constant less than 1 for a finite frequency range.

24. The method of claim 1, wherein the mode converting structure comprises at least two metamaterials, wherein each of the metamaterials has a different dielectric constant.

25. The method of claim 1, wherein the mode converting structure comprises at least one non-superluminal low-loss dielectric material at a finite frequency range, wherein the non-superluminal characteristic of the dielectric medium relates to the dielectric medium having a phase velocity for electromagnetic waves within the finite frequency range that is less than c, the speed of light in a vacuum.

26. The method of claim 1, wherein the mode converting structure consists essentially of non-superluminal low-loss dielectric materials at a finite frequency range, wherein the non-superluminal characteristic of the dielectric medium relates to the dielectric medium having a phase velocity for electromagnetic waves within the finite frequency range that is less than c, the speed of light in a vacuum.

27. The method of claim 1, wherein the mode converting structure comprises at least one of the following: porcelain, glass, plastic, air, nitrogen, sulfur hexafluoride, parylene, mineral oil, ceramic, paper, mica, polyethylene, and aluminum oxide.

28. The method of claim 1, wherein the mode converting structure has a maximum width and length similar to that of the EMR device.

29. The method of claim 1, wherein the mode converting structure has thickness of less than one wavelength of a lowest frequency within a finite frequency range.

30. The method of claim 1, wherein the mode converting structure is configured with a volumetric distribution of dielectric constants for creating at least one deep minimum or null in a far-field directivity pattern.

31. The method of claim 1, wherein the mode converting structure is configured to decrease the far-field sidelobes of the EMR device.

32. The method of claim 1, wherein the mode converting structure is configured to decrease the maximum sidelobe level.

33. The method of claim 1, wherein the mode converting structure is configured to decrease the power level of at least one sidelobe.

34. The method of claim 1, wherein the mode converting structure is configured to change the direction of a strongest sidelobe.

35. The method of claim 1, wherein the EMR device utilizes metamaterial surface antenna technology (MSAT).

36. The method of claim 1, wherein the EMR device includes a horn antenna.

37. The method of claim 1, wherein the mode converting structure is configured with a volumetric distribution of dielectric constants to modify the far-field radiation pattern to compensate for a re-radiating object positioned in the near-field of the EMR device.

38. The method of claim 1, wherein the mode converting structure is configured with a volumetric distribution of dielectric constants to modify the far-field radiation pattern to compensate for a re-radiating object positioned in the far-field of the EMR device.

39. An electromagnetic mode converting structure comprising:

a dielectric structure configured to transform an input field distribution of electromagnetic radiation in a first mode to an output field distribution of electromagnetic radiation in a second mode that approximates a target field pattern, the dielectric structure having a volumetric distribution of dielectric constants selected using an optimization algorithm in which real and imaginary parts of dielectric constants in the volumetric distribution of dielectric constants are treated as individually optimizable variables.

40. An electromagnetic mode converting transmission line junction for a finite frequency range comprising:

a dielectric structure configured to transform an input field distribution of electromagnetic radiation in a first mode to an output field distribution of electromagnetic radiation in a second mode that approximates a target field pattern, the dielectric structure having a volumetric distribution of dielectric constants selected using an optimization algorithm in which real and imaginary parts of dielectric constants in the volumetric distribution of dielectric constants are treated as individually optimizable variables.

* * * * *